United States Patent
del Campo

(10) Patent No.: US 10,907,827 B2
(45) Date of Patent: Feb. 2, 2021

(54) THERMOCHEMICAL SYSTEM AND METHOD

(71) Applicant: Bernardo del Campo, Des Moines, IA (US)

(72) Inventor: Bernardo del Campo, Des Moines, IA (US)

(*) Notice: Subject to any disclaimer, the term of this patent is extended or adjusted under 35 U.S.C. 154(b) by 112 days.

(21) Appl. No.: 16/363,845

(22) Filed: Mar. 25, 2019

(65) Prior Publication Data
US 2019/0293284 A1  Sep. 26, 2019

Related U.S. Application Data

(60) Provisional application No. 62/647,606, filed on Mar. 23, 2018.

(51) Int. Cl.
*F23G 5/46* (2006.01)
*C10J 3/82* (2006.01)
(Continued)

(52) U.S. Cl.
CPC .............. *F23G 5/46* (2013.01); *C10J 3/002* (2013.01); *C10J 3/82* (2013.01); *F23G 5/006* (2013.01);
(Continued)

(58) Field of Classification Search
CPC . F23G 5/46; F23G 5/0273; F23G 5/04; F23G 5/08; F23G 5/12; F23G 5/14; F23G 5/16; F23G 5/006; F23G 5/444; F23G 2201/40; F23G 2201/301; F23G 2206/10; F23G 2900/50201; F23G 2201/304;
(Continued)

(56) References Cited

U.S. PATENT DOCUMENTS 3,098,458 A * 7/1963 Lantz, Jr. .................. C10B 1/10
  110/242
3,780,676 A * 12/1973 Hazzard .................. C10B 53/00
  110/187
(Continued)

FOREIGN PATENT DOCUMENTS

EP  2403926 A1  1/2012
EP  2531573 A1  12/2012
(Continued)

OTHER PUBLICATIONS

Anderson et al, A Comparison of Producer Gas, Biochar, and Activated Carbon from Two Distributed ScaleThermochemical Conversion Systems Used to Process Forest Biomass, Energies 2013, 6(1), 164-183.
(Continued)

*Primary Examiner* — David J Laux
(74) *Attorney, Agent, or Firm* — Hamilton IP Law, PC; Jay R. Hamilton; Charles A. Damschen

(57) ABSTRACT

A thermochemical system & method may be configured to convert an organic feedstock to various products. A thermochemical system may include a solid material feed module, a reactor module, an afterburner module, and a solid product finishing module. The various operational parameters (temperature, pressure, etc.) of the various modules may vary depending on the desired products. The product streams may be gaseous, vaporous, liquid, and/or solid.

19 Claims, 12 Drawing Sheets

(51) Int. Cl.
*F23G 5/00* (2006.01)
*F23G 5/04* (2006.01)
*F23G 5/44* (2006.01)
*C10J 3/00* (2006.01)
*F23G 5/027* (2006.01)
*F23G 5/16* (2006.01)
*F23G 7/00* (2006.01)

(52) U.S. Cl.
CPC ............ *F23G 5/0273* (2013.01); *F23G 5/04* (2013.01); *F23G 5/16* (2013.01); *F23G 5/444* (2013.01); *C10J 2200/09* (2013.01); *C10J 2200/15* (2013.01); *C10J 2300/0909* (2013.01); *C10J 2300/0916* (2013.01); *C10J 2300/1606* (2013.01); *C10J 2300/1671* (2013.01); *F23G 5/0276* (2013.01); *F23G 7/001* (2013.01); *F23G 2201/10* (2013.01); *F23G 2201/301* (2013.01); *F23G 2201/303* (2013.01); *F23G 2201/304* (2013.01); *F23G 2201/40* (2013.01); *F23G 2205/121* (2013.01); *F23G 2206/10* (2013.01); *F23G 2206/203* (2013.01); *F23G 2209/26* (2013.01); *F23G 2900/50201* (2013.01); *Y02E 20/12* (2013.01); *Y02P 20/145* (2015.11)

(58) Field of Classification Search
CPC .... F23G 5/0276; F23G 7/001; F23G 2201/10; F23G 2201/303; F23G 2205/121; F23G 2206/203; F23G 2209/26; C10J 3/82; C10J 3/002; C10J 2300/0909; C10J 2300/0916; C10J 2300/1606; C10J 2200/15; C10J 2200/09; C10J 2300/1671
See application file for complete search history.

(56) References Cited

U.S. PATENT DOCUMENTS

| | | | | |
|---|---|---|---|---|
| 3,785,306 A * | 1/1974 | Jaget | .......................... | F23G 5/20 110/226 |
| 4,084,521 A * | 4/1978 | Herbold | .................... | C10B 7/10 110/242 |
| 5,653,183 A * | 8/1997 | Hansen | ..................... | C10B 7/10 110/229 |
| 5,655,465 A * | 8/1997 | Robertson | ................. | B09C 1/06 110/346 |
| 6,619,214 B2 * | 9/2003 | Walker | ..................... | F23G 5/027 110/101 R |
| 8,236,085 B1 * | 8/2012 | Cheiky | ..................... | C05G 3/80 71/6 |
| 8,361,186 B1 * | 1/2013 | Shearer | ..................... | C05D 9/00 71/32 |
| 8,888,874 B1 * | 11/2014 | Borchert | ................. | C10B 53/02 48/61 |
| 9,284,203 B2 * | 3/2016 | Josse | ...................... | C02F 11/121 |
| 2011/0278149 A1 * | 11/2011 | Hornung | ................. | C10B 49/22 201/12 |
| 2012/0285814 A1 * | 11/2012 | Del Monte | ............... | C10B 7/10 201/32 |
| 2014/0183022 A1 * | 7/2014 | Daugaard | ............. | F26B 25/002 201/2.5 |
| 2015/0259603 A1 * | 9/2015 | Hallowell | ............... | C10B 47/44 202/93 |
| 2019/0293284 A1 * | 9/2019 | del Campo | ........... | F23G 5/0276 |

FOREIGN PATENT DOCUMENTS

| | | |
|---|---|---|
| RU | 2342421 C2 | 12/2008 |
| RU | 2464295 C2 | 10/2012 |
| WO | 2010039165 A1 | 4/2010 |
| WO | 2012096900 A2 | 7/2012 |
| WO | 2012126096 A1 | 9/2012 |

OTHER PUBLICATIONS

International Search Report & Written Opinion, dated Jun. 13, 2019.
Jahirul et al, Biofuels Production through Biomass Pyrolysis—A Technological Review, Energies 2012, 5, 4952-5001.
Zafar et al, Biomass Pyrolysis, Feb. 1, 2009, Solar & Wind, Biomass Energy, www.altenergymag.com.

* cited by examiner

THERMOCHEMICAL SYSTEM AND METHOD

CROSS REFERENCE TO RELATED APPLICATIONS

This non-provisional utility patent application claims priority from provisional U.S. Pat. App. No. 62/647,606 filed on Mar. 23, 2018, which is incorporated by reference herein in its entirety.

FIELD OF THE INVENTION

The present disclosure is related to organic material and methods and apparatuses used in the processing of those organic materials.

STATEMENT REGARDING FEDERALLY SPONSORED RESEARCH OR DEVELOPMENT

No federal funds were used to develop or create the invention disclosed and described in the patent application.

BACKGROUND

Generally, a reactor for processing an organic feedstock (e.g., biomass) is configured to convert the feedstock into a variety of products, such as gas, liquid, and solid products via pyrolysis or other reactions. The conversion rate to each product may be manipulated by several factors, such as the feedstock that is used, the temperature at which the reactor operates, and the amount of oxygen or reacting gases present in the reactor. Any of the products from pyrolysis may be further processed (e.g., the solid products may be activated, the liquid products may be collected, isolated and filtered, etc.).

Various patents exist on biomass reactors to produce gases, oils and biochar via pyrolysis. For example, U.S. Pat. No. 8,361,186 discloses a pyrolysis unit that converts biomass into gas, liquid, and solid products. However, the prior art has several shortcomings, which include but are not limited to being cumbersome, requiring significant energy input, limited to operation with a specific type of feedstock, moisture content, particle size, sensitivity to foreign materials (e.g., rocks, metals, non-uniform sizes or shapes of feedstock), complicated to operate, requiring various operators or sophisticated automation controls, restrictive as to products produced, and/or a lack of mobility/portability.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
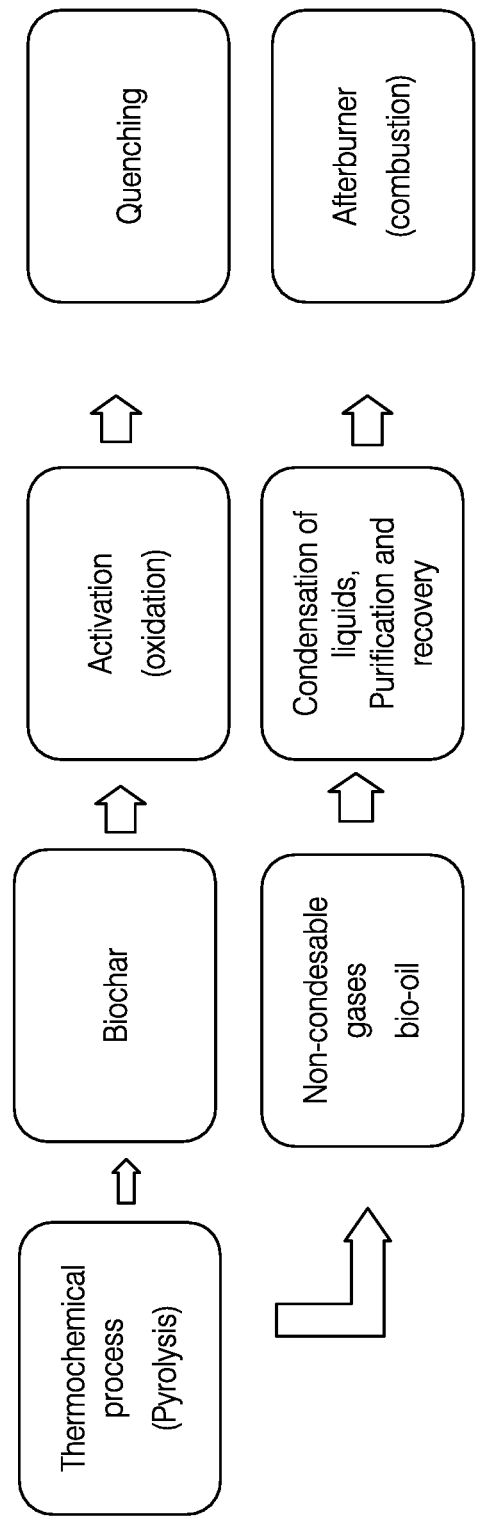
FIG. 1 provides a schematic view of various products and processes that may be made from or included with the thermochemical system & method.

| Element Description | Element Number |
|---|---|
| Thermochemical system | 10 |
| Motor | 12 |
| Support member | 14 |
| Blower | 16 |
| External heat source | 17 |
| Temperature sensor | 18 |
| Vertical gate | 19a |
| Horizontal gate | 19b |
| Organic material feed module | 20 |
| Hopper | 21 |
| Agitator system | 22 |
| Feed module conveying member | 27 |
| Reactor module | 30 |
| Horizontal section | 30a |
| Zone one | 31a |
| Zone two | 31b |
| Zone three | 31c |
| Vessel shroud | 32 |
| Vent | 32a |
| Reactor vessel | 33 |
| Fin | 33a |
| Aperture | 34 |
| Shield | 35 |
| Support member | 36 |
| Reactor conveying member | 37 |
| Ventilation/combustion chamber | 38 |
| Tube | 39 |
| Afterburner module | 40 |
| Chimney | 50 |
| Solid product finishing module | 60 |
| Heat exchanger/insulator | 62 |
| Solid product outlet | 64 |
| Solid product conveying member | 67 |
| Electricity generation module | 70 |

Before the present methods and apparatuses are disclosed and described, it is to be understood that the methods and apparatuses are not limited to specific methods, specific components, specific arrangements, or to particular implementations. It is also to be understood that the terminology used herein is for the purpose of describing particular embodiments/aspects only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

"Aspect" when referring to a method, apparatus, and/or component thereof does not mean that limitation, functionality, component etc. referred to as an aspect is required, but rather that it is one part of a particular illustrative disclosure and not limiting to the scope of the method, apparatus, and/or component thereof unless so indicated in the following claims.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and apparatuses. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and apparatuses. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and apparatuses may be understood more readily by reference to the following detailed description of preferred aspects and the examples included therein and to the Figures and their previous and following description. Corresponding terms may be used interchangeably when referring to generalities of configuration and/or corresponding components, aspects, features, functionality, methods and/or materials of construction, etc. those terms.

It is to be understood that the disclosure is not limited in its application to the details of construction and the arrangements of components set forth in the following description or illustrated in the drawings. The present disclosure is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description, and do not alone indicate or imply that the device or element referred to must have a particular orientation. In addition, terms such as "first", "second", and "third" are used herein and in the appended claims for purposes of description and are not intended to indicate or imply relative importance or significance.

The present thermochemical system & method may be comprised of modular units, which may be fitted in shipping containers or truck trailers such that it may be mobile, transportable, and may be adaptable to many configurations. Different and/or additional components (e.g., a piece of equipment) may be integrated with and assembled to the thermochemical system 10 for one configuration and may be removed and disassembled from the thermochemical system 10 in another configuration. Because the supply of many organic feed materials (e.g., biomass) is scattered, transportation of the organic feed materials may be cost-prohibitive. Accordingly, the thermochemical system & method disclosed herein may effectively allow a user/operator to bring the processing facility to the field, where the organic feed material is located.

Referring now to FIG. 1, which provides a schematic view of various products and processes that may be made from or included with the thermochemical system & method, organic material, which organic material may be comprised of, biomass, coal, tires, plastic, municipal waste, manures, industrial waste, diatomaceous earth or other filtration medias containing organic components, slurries of up to 70 percent by weight moisture, other organic material with approximately 5 MJ/kg energy content or more, and/or combinations thereof without limitation unless otherwise indicated in the following claims, may be used as a primary feedstock. It is contemplated that for embodiments of a thermochemical system 10 and method described below that may be configured to sustain a chemical reaction without an external heat source 17 (but which external heat source 17 may be required to start the chemical reaction) the feedstock may have an energy content of at least 5 MJ/kg in order to produce enough thermal energy to sustain the reaction without an external heat source 17 without limitation unless otherwise indicated in the following claims. Various references are made herein to an organic material feed module 20, which may be included in various embodiments of a thermochemical system 10. However, the use of the term "organic material feed module" 20 does not limit the composition of the feedstock used for the thermochemical system and method as disclosed herein in any way unless otherwise indicated in the following claims. Accordingly, a feedstock comprised of an inorganic material may be used with an organic material feed module 20 without limitation unless otherwise indicated in the following claims.

The organic material may undergo a thermochemical process (e.g., pyrolysis) and thereby be converted into one or more products. Generally, the product of a thermochemical process may be classified as a gas, liquid, or solid. As shown in FIG. 1, the solid product stream may be separated from the gas and liquid product stream, and each product stream may undergo further processing as described in detail below. As will be understood by those skilled in the art, certain amounts of gaseous and liquid products may remain in the solid product stream and vice versa. The specific amount of overlap between matter states in any given product stream may vary from one application of the thermochemical system & method to the next and may be dependent at least upon the organic material feedstock used and the operational parameters for the thermochemical system & method. Accordingly, the amount of gaseous and/or liquid product in the solid product stream and vice versa in no way limits the scope of the present disclosure unless so indicated in the following claims.

As previously mentioned, a wide variety of feedstocks may be used with the thermochemical system and method. Additionally, feedstocks having contaminants (soil, sand, gravel, debris, metal, plastic, water, other foreign objects, etc.) therein may be used without limitation unless so indicated in the following claims. Because of the range of temperatures at which the thermochemical system & method may be operated, the organic material feedstock may include (in addition to those previously listed above) but is not limited to sludge, solid wastes, industrial byproducts, biohazardous wastes, and/or combinations thereof unless otherwise indicated in the following claims.

The solid product stream may be pyrolyzed until it becomes biochar, at which point it may be activated and subsequently quenched via cooling. The activation of the biochar may be accomplished through an oxidation process. Other processes may be used to convert the biochar to activated biochar and/or to quench the activation process without limitation unless so indicated in the following claims. When the thermochemical system is used to maximize the reduction of the input or feedstock, the equipment used with the thermochemical system & method may be configured as a combustor/incinerator to minimize the solid product to all or mostly all mineral ash (minimizing the carbon composition of the solid product).

Still referring to FIG. 1, the liquid and/or gaseous product stream may be comprised of non-condensable gases, and/or liquids. The non-condensable gases may be compressed and stored for further use and/or processing, or they may be supplied to other areas adjacent the thermochemical system and used as fuel. In one configuration, the non-condensable gases may be supplied to an area of the thermochemical system adjacent an organic material feed module 20 to provide fuel to one or more burners to dry and/or otherwise process the organic material. In another configuration, the non-condensable gases (which may include syngas) may be supplied to an afterburner module 40 for combustion.

The condensable gases may be condensed to liquid and stored for further use and/or processing (e.g., purification), or they may be supplied to other areas adjacent the thermochemical system and used as fuel in a manner as previously described for non-condensable gases. The liquid products may be collected, purified, and/or stored for further use and/or processing, or they may be supplied to other areas adjacent the thermochemical system and used as fuel as previously described for the non-condensable and condensable gases. Alternatively, to increase the biochar yields the liquid products can be introduced to the biomass for secondary polymerization and increased biochar yields. The specific use of any product stream in no way limits the scope of the present disclosure unless so indicated in the following claims.

Figure 2A:
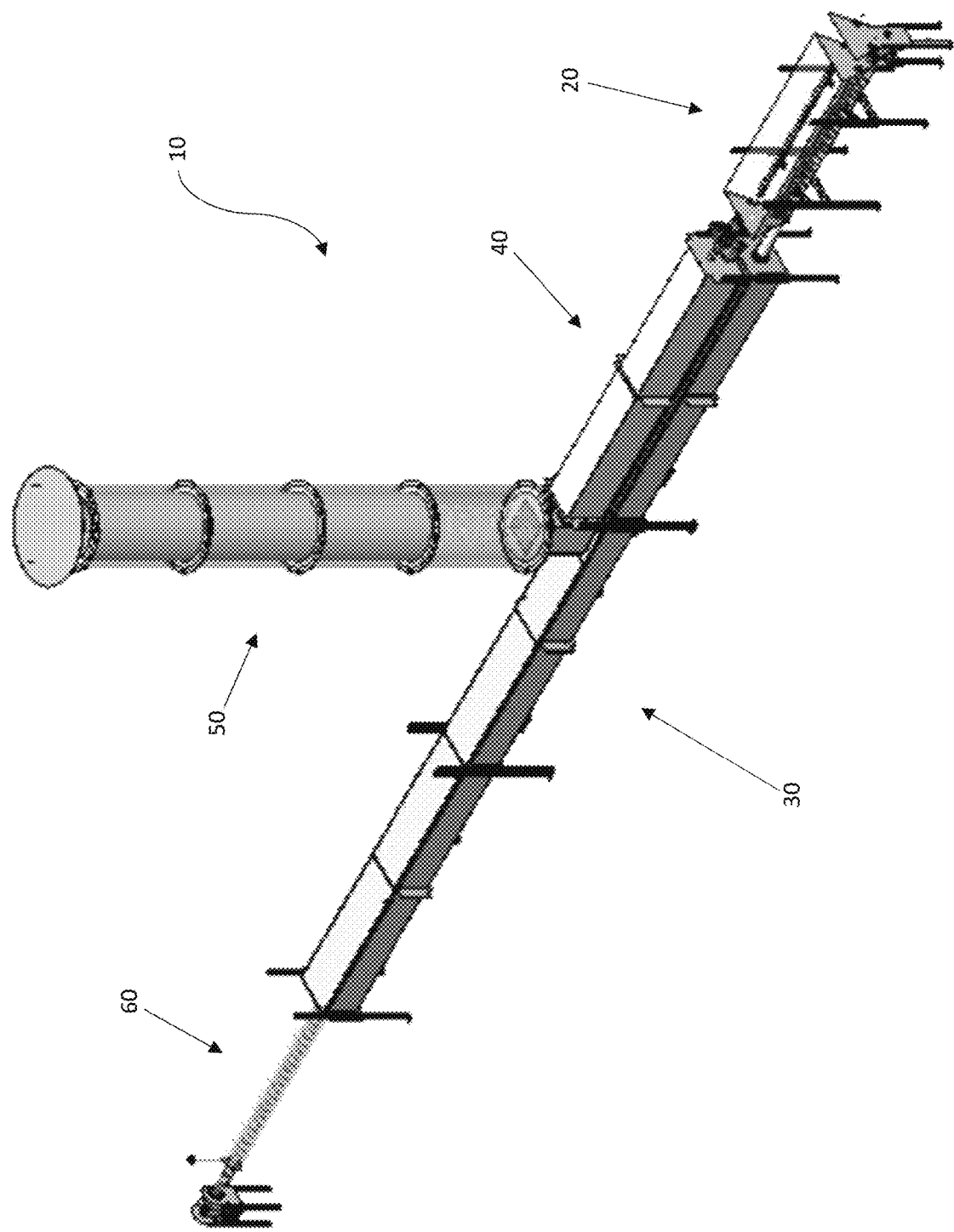
FIG. 2A provides a perspective view of a first illustrative embodiment of a thermochemical system & method.
Figure 2B:
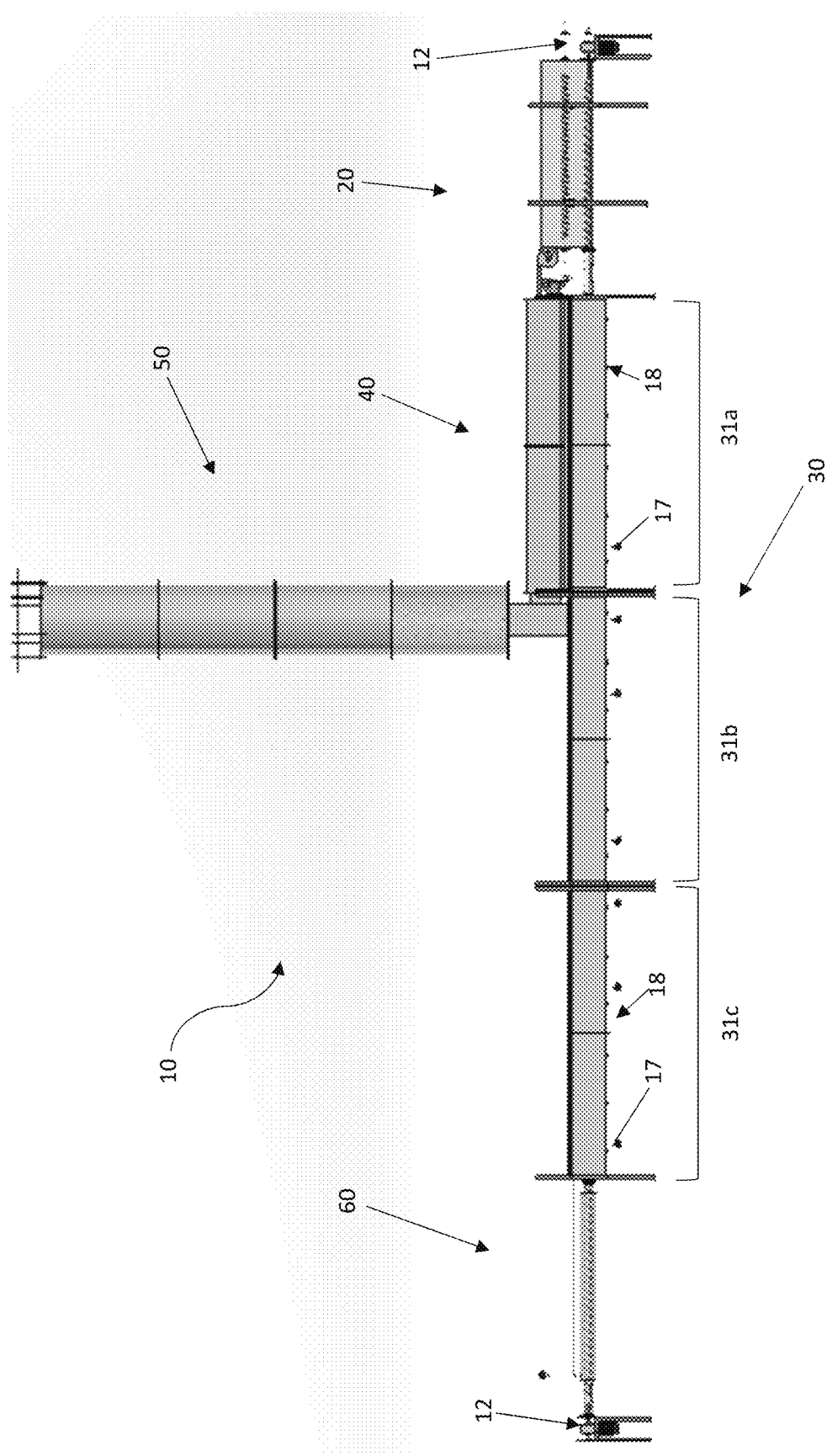
FIG. 2B provides a side of the thermochemical system & method shown in FIG. 2A.
Figure 2C:
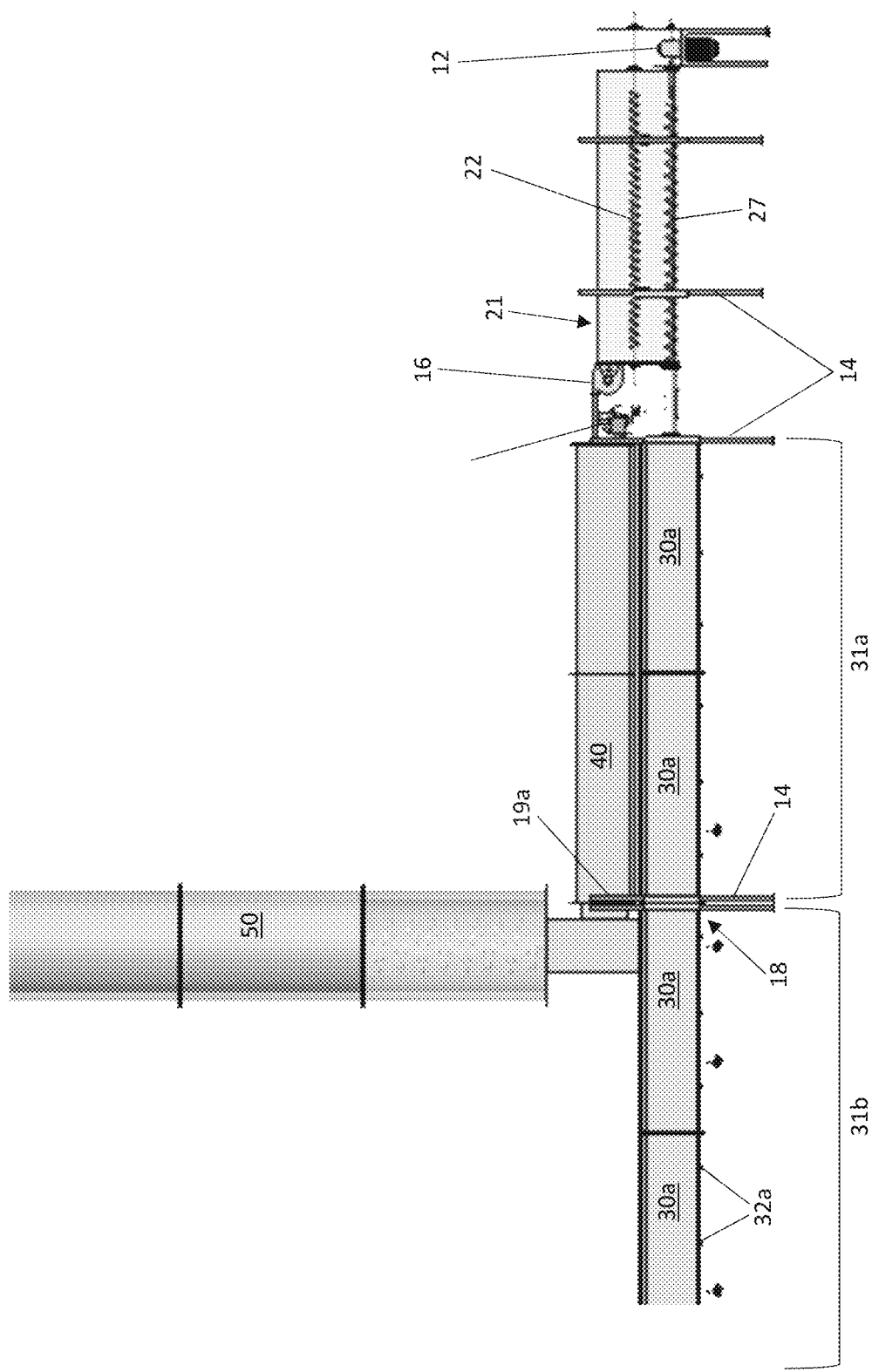
FIG. 2C provides a detailed view of a portion of the thermochemical system & method shown in FIGS. 2A & 2B.

Referring now to FIG. 2A, which provides a perspective view of the first illustrative embodiment of a thermochemical system & method, the thermochemical system & method may be comprised of several modules. The thermochemical system 10 may include an organic material feed module 20, which in FIG. 2A is positioned toward the bottom-right corner of the drawing. A more detailed view of the organic material feed module 20 is shown in FIG. 2C. The organic material feed module 20 may be comprised of a hopper 21 having an agitator system 22 positioned therein to ensure a relatively even and consistent feed of organic material to the thermochemical system 10 by breaking up large clustered chunks and/or other abnormalities in the organic material feedstock to prevent bridging. A feed module conveying member 27 may provide the motive force to convey the organic material from the organic material feed module 20 to the reactor module 30. In the illustrative embodiment pictured herein, the feed module conveying member 27 may be configured as an auger, but any suitable conveying member may be used without limitation unless so indicated in the following claims including but not limited to paddles, screws, belts, chain conveyors, drums, etc. The feed module conveying member 27 may receive rotational energy from a motor 12, which may be mounted external to the hopper 21 and at a terminal end of the feed module conveying member 27.

The thermochemical system 10 may be configured to operate using a wide variety of organic materials and/or combinations thereof as a feedstock, which materials include but are not limited to various types of biomass (e.g., cellulosic-based plant material, lignocellulosic-based plant material, pulp, and/or combinations thereof). Accordingly, the specific configuration of the organic material feed module 20 (including but not limited to the hopper 21, agitator system 22, and/or feed module conveying member 27) may vary from one application of the thermochemical system 10 to the next without limitation unless so indicated in the following claims.

A reactor module 30 may be positioned adjacent the organic material feed module 20, as shown in FIGS. 2A-2D. The reactor module 30 may be configured such that all or a majority of a thermochemical reaction and/or conversion (e.g., pyrolysis) of a portion of the organic material feedstock takes place within the reactor module 30. The reactor module 30 may be configured such that it is comprised of one or more horizontal sections 30a. One or more horizontal sections 30a may comprise one or more zones 31a, 31b, and/or 31c as shown at least in FIGS. 2B & 2C. Each zone 31a, 31b, and/or 31c may be defined by a specific temperature and/or temperature range, residence time (which may be dependent on at least length, auger pitch, rotational speed, etc.) and/or defined by a specific conversion to a specific product. As shown in FIGS. 2A-2D, the illustrative embodiment of a thermochemical system 10 depicted therein may be comprised of at least three zones 31a, 31b, and/or 31c.

Figure 2D:
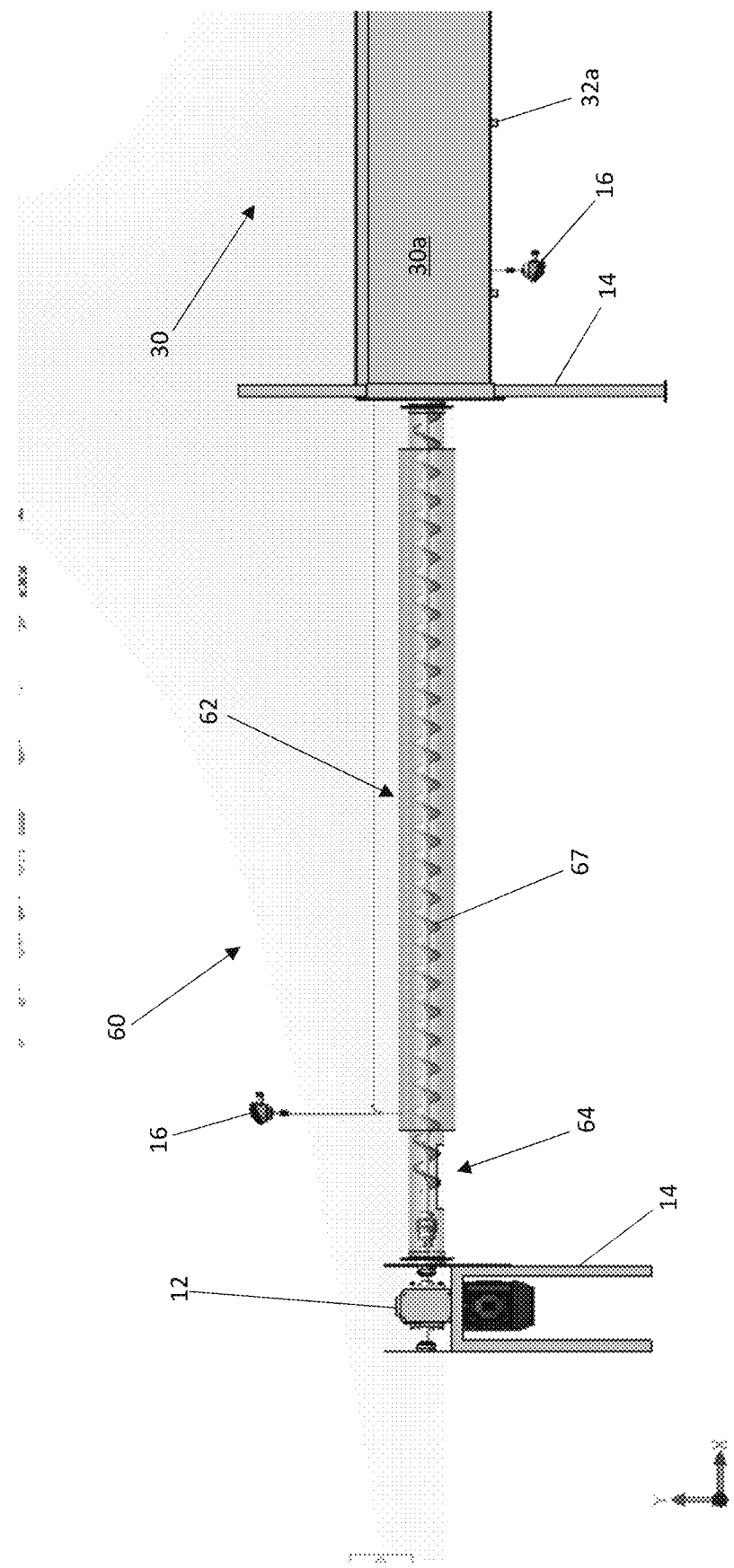
FIG. 2D provides another detailed view of a portion of the thermochemical system & method shown in FIGS. 2A & 2B.
Figure 3B:
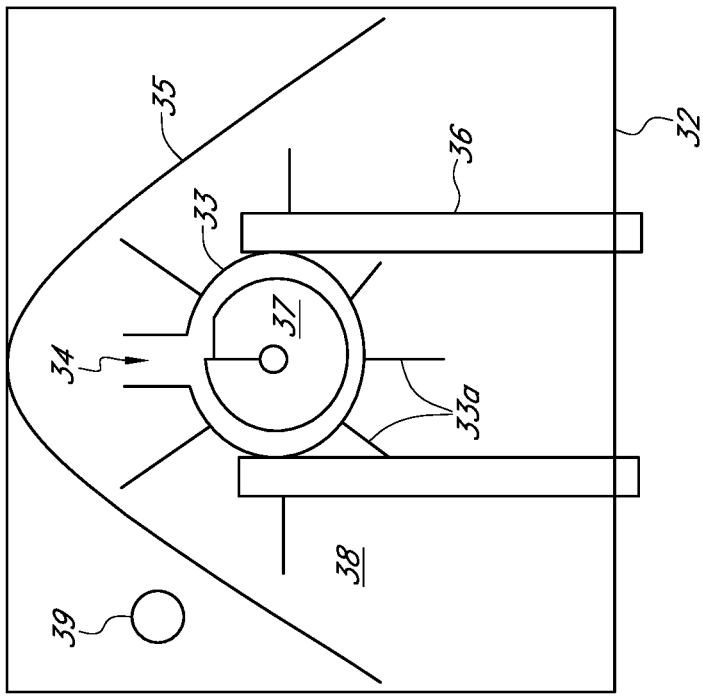
FIG. 3B provides a cross-sectional depiction of a second illustrative configuration of a portion of a reactor module.
Figure 3A:
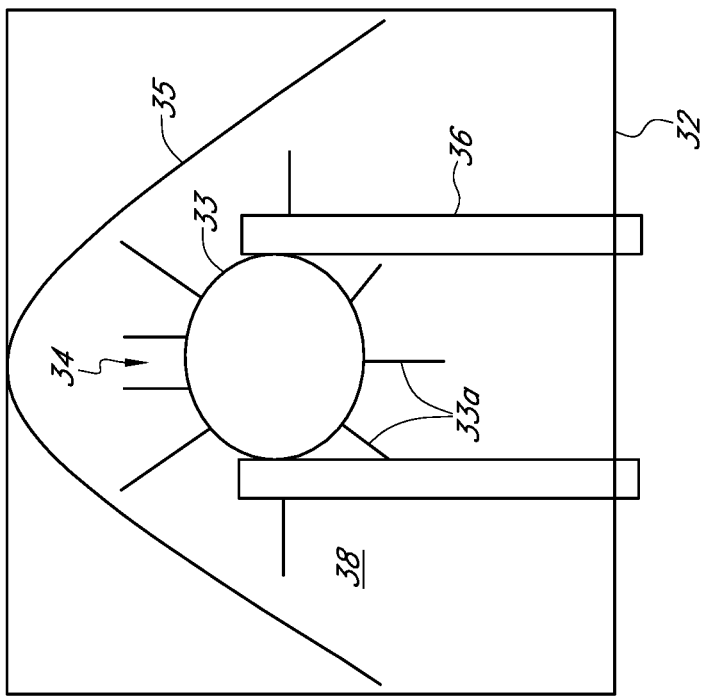
FIG. 3A provides a cross-sectional depiction of a first illustrative configuration of a portion of a reactor module.

Referring still to FIGS. 2A-2D and also FIGS. 3A & 3B (which provide cross-sectional depictions of two illustrative embodiments of a reactor module 30), the thermochemical system 10 may be configured such that zone one 31a is comprised of two horizontal sections 30a, wherein zone one 31a may operate primarily to dry the organic material feed and begin the thermochemical process. However, for configurations of the thermochemical system 10 in which the organic material feedstock is relatively dry initially, zone one 31a may be used to initialize a thermochemical process. Heat may be added to the organic material feed immediately upon entering zone one 31a from the afterburner module 40, combustion of gases and/or vapors (e.g., syngas) within the ventilation/combustion chamber 38, and/or an external heat source 17 as further described in detail below. Moisture, vapor, liquid, and/or gases may exit the reactor vessel 33 through one or more apertures 34 formed therein, which may be on the top of the reactor vessel 33 to reduce the pressure therein. Additionally, the apertures 34 may be sized, spaced, and/or shaped to mitigate and/or eliminate the elutriation of particles, which may increase the yield of the thermochemical system 10 while simultaneously reducing particulate matter in emissions. Generally, but without limitation unless otherwise indicated in the following claims, the mass percentage of solid material within the reactor vessel 33 may increase in a direction from right to left in the orientation shown in FIGS. 2B-2D. That is, the mass percentage of solid material in the organic material feed module 20 may be less than that in zone one 31a, which may be less than that in zone two 31b, and so one. The organic material exiting zone one 31a and entering zone two 31b may be between 400 and 900 C, and in some embodiments may be at a temperature of approximately 700 C.

An external heat source 17, which may be configured as any suitable heat source including but not limited to an electric heating element, a propane, natural gas, syngas, liquid fuel burner, etc. (unless otherwise indicated in the following claims) may be configured to add heat to the organic material feed module 20 and/or reactor module 30 to start and/or sustain combustion of gases, liquids, and/or vapors released during the thermochemical process. It is contemplated that after a certain amount of time (e.g., one hour) the external heat source 17 may be disengaged, and the combustion of the gases and/or vapors released via the thermochemical process (e.g., syngas) may provide the required thermal energy to sustain and/or complete the thermochemical process. The illustrative embodiment in FIG. 2B shows two external heat sources 17, one near the interface of zone three 31c of the reactor module 30 and the solid product finishing module 60 and another near the interface between zone one 31a and zone two 31b. However, in other embodiments more external heat sources 17 may be used (such as one positioned within the afterburner module 40), and in still other embodiments the external heat source 17 adjacent the interface between zones one and two 31a, 31b may be eliminated. Accordingly, the scope of the present disclosure is not limited by the specific number and/or placement of external heat sources unless otherwise indicated in the following claims.

The thermochemical system 10 may be configured such that zone two 31b is also comprised of two horizontal sections 30a and may operate primarily to begin and/or sustain a thermochemical process on the organic material within the reactor vessel 33, such that various liquids, gases, and/or vapors are released from the organic material through a plurality of apertures 34 formed in the reactor vessel 33. The organic material exiting zone two 31b and entering zone three 31c may be between 200 and 750 C, and in some embodiments may be at a temperature of approximately 400 C. As the organic material passes through zone two 31b (from right to left using the orientation shown in FIGS. 2B & 2C), the thermochemical process may proceed, and the temperature of the organic material may decrease from as high as 900 C at the interface between zone one 31a and zone two 31b to as low as 250 C at the interface between zone two 31b and zone three 31c. In one embodiment, the temperature gradient within zone two 31b may be from 1250 to 250 C (in a direction from right to left for the orientation shown in FIGS. 2B & 2C).

The thermochemical system 10 may be configured such that zone three 31c is also comprised of two horizontal sections 30a and may operate primarily to sustain and/or finish a thermochemical process on the organic material within the reactor vessel 33, such that various gases, vapors, and/or liquids are released from the organic material through a plurality of apertures 34 formed in the reactor vessel 33. It is contemplated that in some applications liquid may be released through apertures 34 formed in the bottom half of the reactor vessel 33 and gases and/or vapors may be released through apertures 34 formed in the top half of the reactor vessel 33 such that gravity aides in the separation process. However, other configurations may be used without limitation unless so indicated in the following claims.

The organic material exiting zone three 31c and entering the solid product finishing module 60 may be between 150 and 1300 C, and in some embodiments may be at a temperature of approximately 200 C. Generally, air may enter the reactor module through zone three 31c, such the ambient air may cool zone three 31c resulting in a relatively lower temperature than other areas of the reactor module 30. However, when configured for certain products, the temperature of zone three 31c may be relatively high, as described in further detail below.

As the organic material passes through zone three 31c (from right to left using the orientation shown in FIGS. 2B & 2C), the thermochemical process may be completed and the organic material may be allowed to cool, and the temperature of the organic material may decrease from as high as 900 C at the interface between zone two 31b and zone three 31c to as low as 150 C at the interface between zone three 31c and the solid product finishing module 60. In one embodiment, the temperature gradient within zone three 31c may be from 400 to 200 C (again moving right to left), and in another embodiment, the temperature within zone three 31c may be relatively constant at approximately 700 C.

In some applications, it may be desirable to cool the solid product (and/or slowly aerate the solid product) to a temperature between 40 and 100 C (and in some applications to about 60 C) before the solid product passes through the solid product outlet 64. The heat exchanger/insulator 62 may function to remove thermal energy from the solid product within the solid product finishing module 60 and transfer all or a portion of that thermal energy to other components of the thermochemical system 10 (e.g., the organic material feed module 20, the reactor module 30, etc.) for increased efficiency. The heat exchanger/insulator 62 may be configured as a shell-and-tube heat exchanger utilizing air, water, or other fluids as a heat transfer fluid. Alternatively, the heat exchanger/insulator 62 may be configured with a vacuum or insulating gases therein to maintain the temperature of the moving mass within the solid product finishing module 60.

Although temperature ranges for the various zones 31a, 31b, 31c are given above, those ranges are for illustrative purposes only and in no way limit the scope of the present disclosure unless so indicated in the following claims. The optimal temperature of any zone 31a, 31b, 31c and/or other portion of the thermochemical system 10 may be dependent on various factors, including but not limited to the desired properties for the solid, liquid, and gas product stream. For example, in a configuration in which the thermochemical system is optimized to produce solid char, the temperature of the reactor module 30 may be relatively consistent along its entire length (e.g., at a temperature of approximately 400 C). Whereas in another configuration in which the thermochemical system is optimized to produce higher gas yields, the temperature of the reactor module 30 may be relatively consistent at higher temperatures approximately 800 C. For example, in a configuration in which the thermochemical system 10 is optimized to produce a solid product of a specific type of activated carbon, the temperature may reach as high as 1200 C in the presence of oxidizing gases to modify its surface chemistry. Table 1 below provides various product streams and ratios thereof by mass for a given feedstock and set of operational parameters for the thermochemical system 10 having the same components. The variety of products that may be produced and the variety of usable feedstocks serve to further demonstrate the flexibility of the thermochemical system & method according to the present disclosure.

TABLE 1

Feedstock, thermochemical process and output.

| Feedstock | Thermochemical parameters | Yields (dry base) |
|---|---|---|
| Maple Sawdust, ground ½" screen, 20% moisture | Intermediate Pyrolysis at 500 C. | 30% Biochar, 70% of non-condensable gases and bio-oil |
| Maple Sawdust, ground ½" screen, 10% moisture | Pyrolysis and activation | 15% activated carbon, 85% of non-condensbale gases and bio-oils |
| Spent Diatomaceous earth, with oil contents of 50% | Pyrolysis at 600 C. | 60% biochar |
| Spent Diatomaceous earth, with oil content of 50% | Combustion mode for incineration of oil and recovery of DE 900 C., air addition and post oxidation | 50% recycled diatomaceous earth, small traces of organics remaining |
| Cow manure sludge 70% of water | Drying, pyrolysis at 600 C. with bio-oil recovery | 25% biochar yield, 40% of bio-oil recovery and 35% of combusted non-condensable gases |
| Cow Manure sludge 70% of water | Drying and torrefaction | 80% yield of torrefied biomass, 20% of bio-oil and non-condensable gases burnt |

Additionally, the properties of the solid product (e.g., carbon content, amount of volatiles, fixed carbon, ash, elemental analysis, energy content, etc.) may be modified based on other features of the thermochemical system 10, which include but are not limited to unless so indicated in the following claims, organic carbon content, $H:C_{org}$ ratio, cation or anion exchange capacity, pH, particle density, porosity, pore size distribution, average pore size, crystallinity structure, particle size distribution, surface area, iodine number, surface area per mass, and/or adsorption capacity. The solid product may be cooled in a variety of manners, such through the use of the heat exchanger/insulator 62, water spraying, addition of previously cooled material, adding combusted gaseous products with low oxygen content or inert gases in any state of matter, storing in high vacuum environments, re-condensed steam from a dryer, addition of other materials (e.g., nutrients, microbes, organic additives, pH adjusters, compost, manures, etc.) and may be further processed for storage, transport, and/or later use (e.g., grinding, pelletizing, classification, etc.). In one illustrative embodiment, the solid product may be cooled via introduction of an inert gas in a liquid or solid state of matter (e.g., liquid argon, helium, nitrogen, carbon dioxide, solid nitrogen or carbon dioxide, etc.), which may increase the safety of operating the thermochemical system 10. It is contemplated that such cooling may quench and/or arrest any chemical reaction within the solid material, which may further contribute to increased safety of the thermochemical system 10 and method. The solid product may be allowed to be kept at high temperatures for longer periods of time and cool at a relatively slow rate, effectively increasing the residence time of the solid product within the solid product finishing module 60 or on a separate high temperature storage bin, which increased residence time may in turn increase the degree of carbon crystallization in the solid product.

The thermochemical system 10 may allow for sequestration of carbon dioxide within the solid product. When biomass is pyrolyzed at more than 350 C the carbon molecules organize in a recalcitrant carbon form which prevents microbes and abiotic factors to decompose and oxidize the solid carbon into carbon dioxide or other forms of labile carbon. This form of carbon typically is arranged in polymers of aromatic benzene rings and can stay unaltered for hundreds to thousands of years. As the plant absorbs the carbon dioxide from the air and turns it into biomass, processes such as pyrolysis carried out in the thermochemical system 10 can effectively "lock" that carbon contained in the biomass and turn it into a recalcitrant and stable form that could have various uses besides the carbon sequestration feature.

Additionally, the liquid, gas, and/or vapor components released at various points along the length of the various zones 31a, 31b, 31c may vary from one configuration of the thermochemical system 10 to the next. In one illustrative embodiment, the majority of liquid, gas, and/or vapor products exiting the reactor vessel 33 in zone one 31a is moisture, which may lead to increased quality of biooil condensate in later sections/zones 31a, 31b, 31c. The majority of liquid, gas, and/or vapor products exiting the reactor vessel 33 in zone two 31b may be heavier phenolic oligomers, and the majority of liquid, gas, and/or vapor products exiting the reactor vessel 33 in zone three 31c may be non-condensable gases.

Generally, the longer the thermochemical process is allowed to proceed on the organic material, the higher the yield of gases and/or vapors and the lower the yield of solids. It is contemplated that for many organic material feedstocks comprised of organic material, the majority of gases and/or vapors released during the thermochemical process may be combustible. However, it is contemplated that for a thermochemical system 10 configured with a reactor module 30 designed for pyrolysis, a certain amount of steam and carbon dioxide may be released throughout the process in various quantities. A portion of these gases and/or vapors may be consumed within the reactor module 30 and provide the energy required to sustain the thermochemical process.

Referring specifically to FIGS. 3A & 3B, which provide two cross-sectional views of two illustrative embodiments of a reactor module 30, a reactor vessel 33 may be positioned within a vessel shroud 32. The reactor vessel 33 may be positioned within the vessel shroud 32 near the geometric center of the vessel shroud 32 and such that the vessel shroud 32 surrounds or nearly surrounds the entire reactor vessel 33. The vessel shroud 32 may be formed with one or more vents 32a along a bottom surface thereof as shown in FIGS. 2C & 2D. As shown in FIGS. 3A & 3B, the vessel shroud 32 may be formed such that it has a generally square cross-sectional shape whereas the reactor vessel 33 may have a generally circular cross-sectional shape without limitation unless otherwise indicated in the following claims. The reactor vessel 33 may be support by one or more support members 36 such that the reactor vessel 33 is elevated with respect to the bottom surface of the vessel shroud 32.

The reactor vessel 33 may be formed as a pipe having a reactor conveying member 37 positioned therein. The reactor conveying member 37 may be formed as an auger but any suitable conveying member may be used without limitation unless so indicated in the following claims including but not limited to paddles, screws, belts, chain conveyors, rotating pipes and drums, etc. However, when the configuration of the thermochemical system is inclined or vertically sloped it may not require a conveying mechanism and instead gravity may provide the motive force for the organic material. In a thermochemical system 10 wherein the reactor vessel 33 is formed as a pipe, the diameter of the pipe may be from 3 to 36 inches without limitation unless so indicated in the following claims. In one embodiment, the diameter of the reactor vessel 33 may be 6 inches, and it is contemplated that the diameter of the reactor vessel 33 may affect the optimal length thereof because the diameter of the reactor vessel 33 may affect the reaction rate as well as the degree of conversion of the solid material to the desired product(s). Accordingly, the diameter of the reactor vessel 33 may be proportional to the length thereof for the specific application of the thermochemical system 10. However, the reactor vessel 33 and reactor conveying member 37 may be different configured (i.e., other cross-sectional shapes, etc.) in other embodiments of the thermochemical system 10 without limitation unless so indicated in the following claims.

The reactor vessel 33 may be configured such that a certain amount of mixing of the material within the reactor vessel 33 occurs as the organic material moves through the reactor vessel 33. For example, in one embodiment baffles may be added at various positions along the length of the reactor vessel 33. Additionally, the reactor conveying member 37 may be configured to achieve a certain amount of mixing of the material within the reactor vessel 33 during operation. The reactor conveying member 37 may also be configured to provide discrete boundaries between various zones 31a, 31b, 31c within the reactor module 30, a discrete boundary between the organic material feed module 20 and reactor module 30, and/or a discrete boundary between the reactor module 30 and solid product finishing module. In an embodiment wherein the feed module conveying member 27, reactor conveying member 37, and solid product conveying member 67 are formed as one continuous screw-type conveying member, multiple pieces of fighting may be incorporated on opposite sides of fighting to enhance mixing (e.g., concentric fighting portions that are diametrically opposed to one another). During operation, the gaps in the flighting portions may cause the organic material to form natural plugs, which may create a discrete boundary between modules and/or between zones 31a, 31c, 31c. If specific boundaries are also required for various processing zones, constrictions or reduced diameters of pipe could be implemented as well as the removal for small sections of fighting to create a plug due to the non-conveying portion of the auger (i.e., the portion having flighting removed).

A shield 35 may be positioned around a portion of the reactor vessel 33, which shield 35 may direct heat back towards the reactor vessel 33 and mitigate heat loss through the vessel shroud 32. As shown in FIGS. 3A & 3B, the shield 35 may be curved such that it drapes over the reactor vessel 33, wherein the shield 35 may be higher in the middle portion thereof and lower on the end portions thereof. The area between the reactor vessel 33 and the shield 35 may generally be referred to as a ventilation/combustion chamber 38. The area between the shield 33 and the vessel shroud 32 may be configured with insulation positioned therein, and/or additional pipes, tubes, and/or headers through which gases, vapors, and/or liquids may pass. It is contemplated that gases released during the thermochemical process may be combusted within this chamber 38, and that the thermal energy from that combustion may provide the energy required to begin, sustain, and/or drive the thermochemical process. Generally, it may be advantageous for this combustion to occur as close as possible to the reactor vessel 33 to provide the most efficient heat transfer possible to the reactor vessel 33, and for some applications the most efficient heat transfer possible to the reactor vessel 33 may be for gases/vapors released through the apertures 34 to be combusted immediately or nearly immediately after exiting the reactor vessel 33. In some applications it is contemplated that it may be advantageous for the reactor vessel 33 to be completed engulfed in flames from the combustions of gases/vapors released from the organic material or from an external heat source 17. The reactor vessel 33 may also be formed with one or more fins 33a thereon and extending outward therefrom for increased thermal efficiencies (e.g., to increase the amount of thermal energy transferred to the reactor vessel 33) from one or more heat sources, such as combustion within the ventilation/combustion chamber 38. The fins 33a may also aide in heat transfer to the reactor vessel 33 by facilitating a more turbulent flow within the ventilation/combustions chamber 38.

Generally, temperature of the material within the reactor vessel may be controlled and/or manipulated through the control of air flow into the ventilation/combustion chamber 38 as described in further detail herein below. Typically, a greater mass flow rate of air may result in increased combustion, which may in turn result in increased temperature. Positioning pipes, tubes 39, and/or headers above the shield 35 as shown in FIG. 3B may allow for the capture some of the escaping heat and may keep air in the ventilation/combustion chamber 38 hot for better combustion. These pipes, tubes 39, and/or headers (air or gas injection) could also be positioned below shield 35 for maximizing the heating of the air or gases.

The configuration of the fins 33a may be uniform or non-uniform along the length of the reactor vessel 33. For example, when configuring the fins 33a to maximize heat transfer for a specific section of the reactor vessel 33, that section having higher heat transfer characteristics may result in increased yield of a specific product. For higher bio-oil yields, faster heating of the biomass is required to prevent catalysis of oils into gases. Accordingly, a thermochemical system 10 configured to produce a relatively high amount of bio-oil may require a reactor vessel 33 configured such that the rate of heat transfer to the reactor vessel 33 is relatively fast.

In the illustrative embodiment of a thermochemical system 10, one or more blowers 16 may be configured to blow gases/vapors within the ventilation/combustion chamber 38 countercurrent to the flow of organic material. That is, the gases/vapors may move from right to left in the solid product finishing module 60 and/or reactor module 30 (and zones 31a, 31b, and 31c thereof, respectively, in the orientation shown in FIGS. 2B & 2C (e.g., in a direction from the solid product finishing module 60 toward the organic material feed module 20). However, in other embodiments the flow of organic material may be concurrent with respect to the flow of gases/vapors within the ventilation/combustion chamber 38 without limitation unless otherwise indicated in the following claims. In such an embodiment it may be advantageous to position a chimney 50 (in place of or in addition to the chimney 50 shown in FIGS. 2A-2C) adjacent the solid product finishing module 60.

Any gases/vapors remaining at the interface between zone one 31a and the organic material feed module 20 may pass into an afterburner module 40. The afterburner module 40 may be fluidly connected to zone one 31a of the reactor module 30 adjacent the end of zone one 31a closest to the organic material feed module 20 (i.e., to the right end of zone one 31a as shown in the orientation in FIGS. 2B & 2C). However, as discussed below, in other illustrative embodiments the afterburner module 40 may be positioned closer to the solid product finishing module 60. A blower 16 may also direct air, gas, and/or vapor flow from right to left in the afterburner module 40 in the orientation shown in FIGS. 2B & 2C. The afterburner module 40 may be fluidly connected to a chimney 50 at the opposite end of the afterburner module 40, and the chimney 50 may vent to the atmosphere. The exhaust of the chimney 50 and/or afterburner module 40 may be configured with a filter or catalytic media (e.g., bag filter, solid-packed media filter such as dolomite, calcium chloride, calcium carbonate, char, activated carbon, sand, biomass, etc.) to ensure removal or destruction of unwanted compounds from the exhaust gases. Any other suitable methods and/or structures to ensure emissions control may be used, such as water spray, without limitation unless so indicated in the following claims.

Generally, the afterburner module 40 may receive thermal energy from an external heat source 17 and may be operated at a sufficient temperature to ensure that sufficient combustion occurs, such that the amount of volatile organic compounds, particulate matter, and other gases and/or vapors released to the atmosphere through the chimney 50 are within the applicable environmental regulatory standards. Integrating the afterburner module 40 with the thermochemical system 10 allows for a user/operator to control various emissions. For some configurations, the temperature within the afterburner module 40 may be controlled such that it is at least 800 C to ensure a proper level of combustion, and in other configurations it may be at least 1200 C such that the maximum amount of contaminants (e.g., volatile organic compounds, smoke, particulate material, etc.) are removed and/or combusted prior to exhausting to the atmosphere. The flow characteristics of air and gas and/or vapors from the reactor module 30 to the afterburner module 40 may be configured to lean or stoichiometric ratios and to yield a residence time of approximately two seconds (or a residence time of approximately one to six seconds) for certain applications without limitation unless otherwise indicated in the following claims.

In one embodiment, the external heat source 17 (e.g., a propane burner) may be positioned adjacent the interface between the organic material feeds module 20 and the after burner module 40 such that gases and/or vapors are subjected to the external heat source 17 immediately upon entering the afterburner module 40, thereby increasing the likelihood of combusting the gases and/or vapors shortly after they have entered the afterburner module 40. However, it is contemplated that after a certain amount of time (e.g., one hour) for many configurations of the thermochemical system 10 any external heat source 17 adjacent to the afterburner module 40 may be disengaged and the thermochemical process may proceed without aide from any external heat source 17, and that the afterburner module 40 may maintain the desired temperature without the external heat source 17 active. In some configurations, a certain amount of combustion may occur within the chimney 50, and in other embodiments more than one chimney 50 may be employed, as described in further detail below. For some configurations, a blower may assist to control the combustion process inside the afterburner.

Figure 6A:
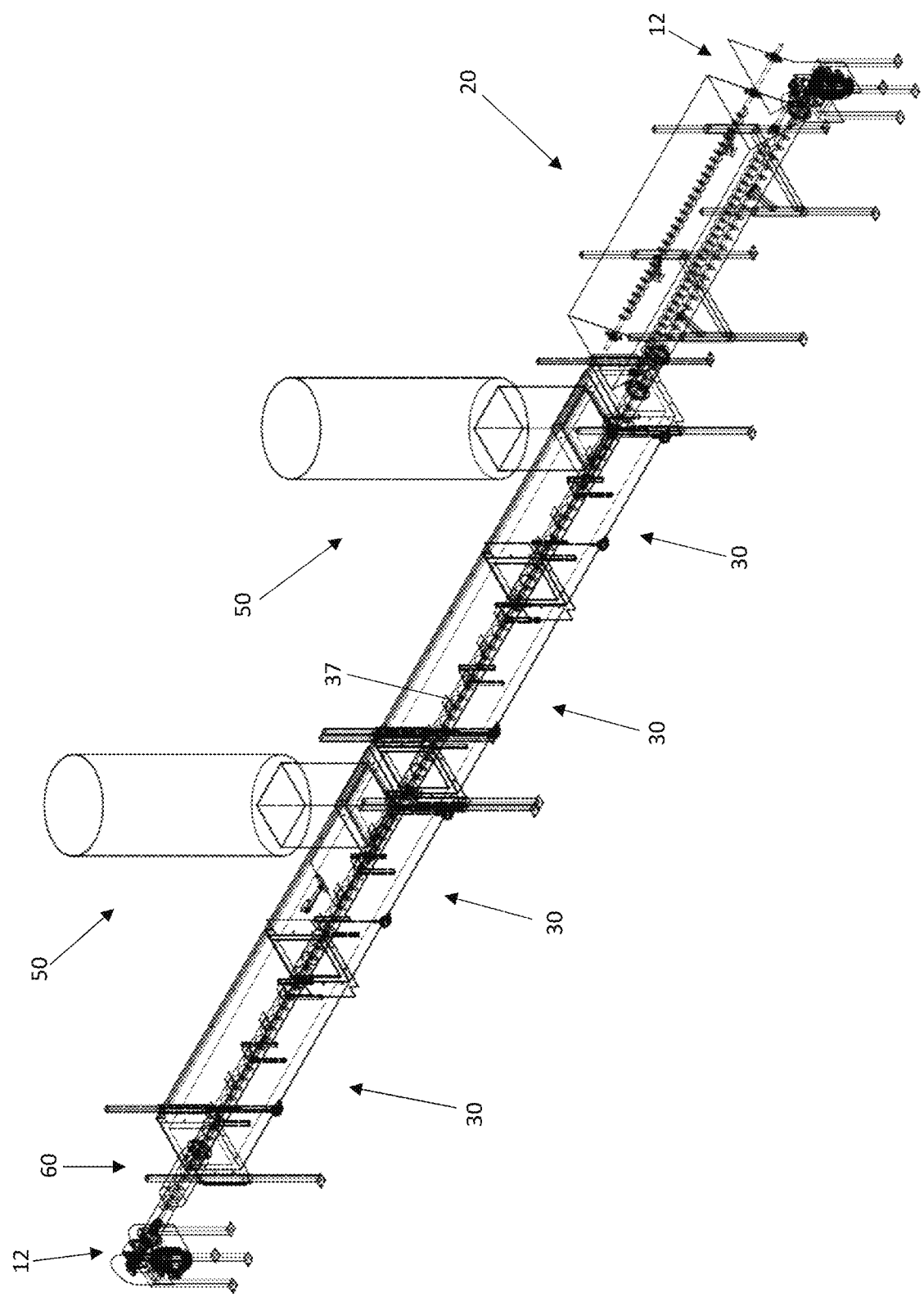
FIG. 6A provides a perspective view of another embodiment of a thermochemical system having two chimneys wherein various external components are shown as transparent.
Figure 6B:
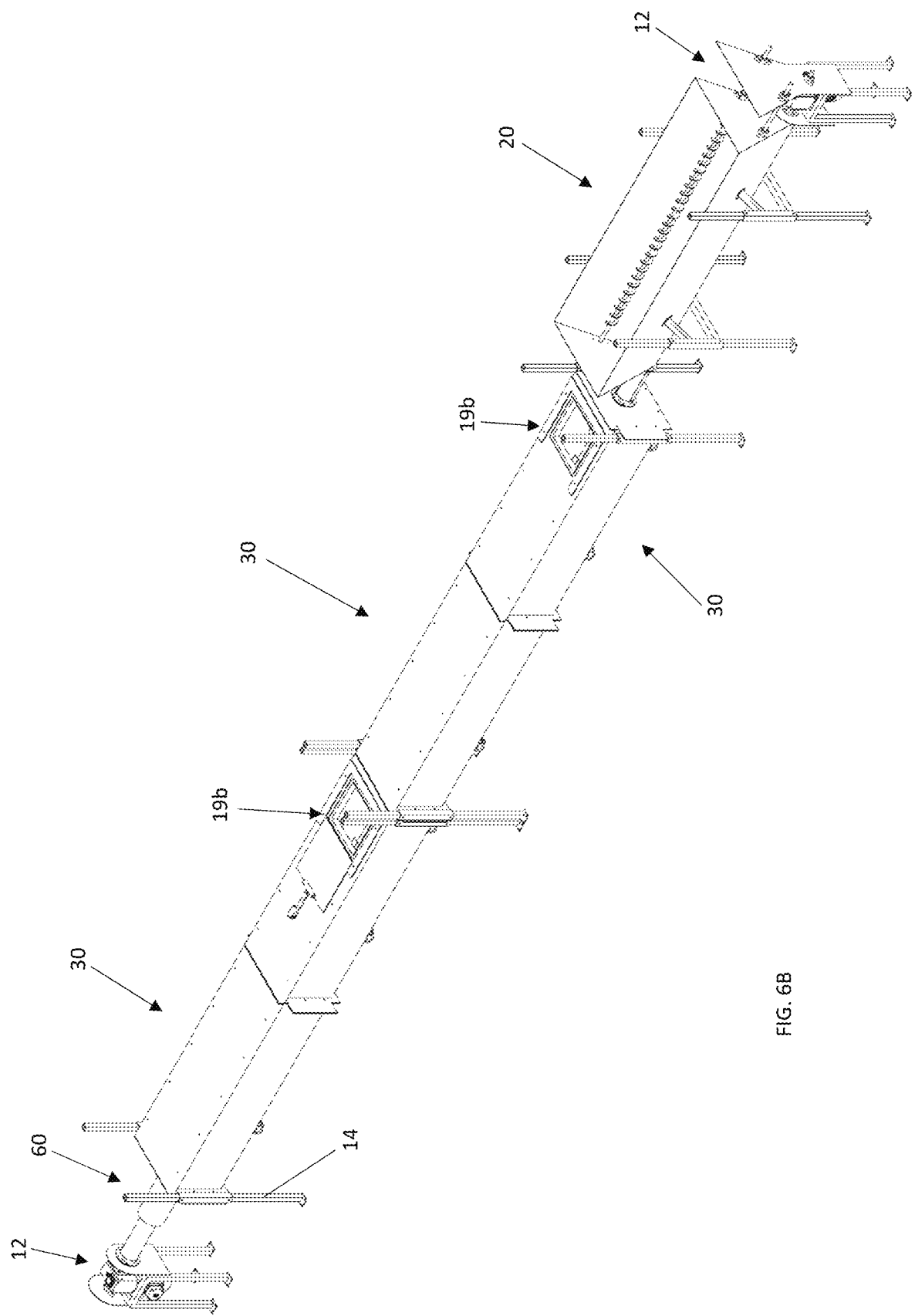
FIG. 6B provides a perspective view of the thermochemical system from FIG. 6A with the chimneys removed and no external components shown as transparent.

In still other embodiments such as that shown in FIGS. 6A & 6B an adjustable horizontal gate 19b may be positioned at the bottom of the chimney 50 to fluidly connect the chimney 50 to the reactor module (which connection may be at the portion of the ventilation/combustion chamber 38 adjacent the chimney 50), thereby allowing an operator to adjust the flow of gases and/or vapors from the ventilation/combustion chamber 38 to the chimney 50, which may affect the temperature of all or a portion of the reactor module 30. Generally, but without limitation unless otherwise indicated in the following claims, the horizontal gate 19b may be configured as a plate that is slidable with respect to an opening such that the plate may completely cover the opening in a closed position, the plate may be slid away from the opening so as to completely expose the opening, or the plate may be positioned at any point between a fully open and fully closed position. Other suitable structures and/or methods may be used to provide a user-selected opening between a chimney 50 and reactor module 30, an afterburner module 40 and a reactor module 30, and/or an afterburner module 40 and a chimney 50 without limitation unless otherwise indicated in the following claims.

A similarly adjustable vertical gate 19a (as shown in FIG. 2C) may be positioned between the afterburner module 40 and the chimney 50 to allow an operator to adjust the flow of gases and/or vapors from the afterburner module 40 to the chimney 50. Alternatively, or additionally, a horizontal gate 19b may be positioned at the interface of zone one 31a and the afterburner module 40. Accordingly, the specific temperature, fluid connectivity, and/or configuration of the afterburner module 40 and chimney(s) 50 may vary from one environmental jurisdiction to the next and is therefore in no way limiting to the scope of the present disclosure unless so indicated in the following claims.

Generally, it is contemplated that the temperature of all or a portion of the reactor module 30 for a given feedstock material may be controlled using the draft, air flow characteristics into the ventilation/combustion chamber 38, and feedstock material feed rate. By controlling the amount that the gate(s) 19a, 19b leading to the afterburner module 40 are open, the amount of air included in the ventilation/combustion chamber 38, the inclination of the reactor vessel 33 within the ventilation/combustion chamber 38, and the operation of the afterburner module 40, the hot gases produced by the thermochemical reaction may create a draft and force those gases out of the reactor vessel 33, which can be used to control the thermochemical process by controlling the temperature of various portions of the thermochemical system 10. The position of the gate(s) 19a, 19b may control characteristics (e.g., volumetric flow rate, linear speed, turbulence, etc.) of the combustion products as they travel through the horizontal sections 30a of the reactor module 30 and/or afterburner module 40. For example (in reference to FIGS. 2B & 2C), if the middle horizontal gate 19b (under chimney 50 but not shown in FIGS. 2B & 2C) is opened less, combustion products may travel to the right, and with the correct amount of air (e.g., from a blower 16), that may prevent further combustion, which may result in lower temperatures on right sections 30a. In an extreme case, opening the middle horizontal gate 19b to the maximum position may prevent gases from going through the afterburner module 40 as the draft produced in the chimney 50 may drive the combustion products to the middle horizontal gate 19b.

Generally, the position of the gate(s) 19a, 19b and control of any blowers 16 may allow a user/operator to manipulate the amount of combustion that takes place in the reactor module 30 relative to that which takes place in the afterburner module 40 (if present) relative to that which takes place in the chimney 50 so as to affect the temperature profile of the reactor module 30. If a generally higher temperature is desired within the reactor module 30 (or a zone 31, 31b, 31c thereof), the speed of a blower 16 may be increased and any gate 19a, 19b between the reactor module 30 and a chimney 50 or afterburner module 40 may be restricted so that more combustion occurs within the reactor module 30 and not within a chimney 50 or after burner module 40. Conversely, if a generally lower temperature is desired within the reactor module 30 (or a zone 31, 31b, 31c thereof), the speed of a blower 16 may be decreased and any gate between the reactor module 30 and a chimney 50 or afterburner module 40 may be opened so that more combustion occurs within a chimney 50 or after burner module 40 and not within the reactor module 30. A thermochemical system 10 comprised of two chimneys 50 may allow the user to more precisely control the draft and where the combustion occurs within the reactor module 30 (or a zone 31*a*, 31*b*, 31*c* thereof), the afterburner module 40, and/or one of the chimneys 50.

An illustrative embodiment of a thermochemical system 10 configured with two chimneys 50 is shown in FIG. 6A. In FIG. 6A, various external portions of the thermochemical system 10 have been shown as transparent so that various internal components may be visible. The same thermochemical system 10 is shown in FIG. 6B wherein the chimneys 50 have been removed and no portions are transparent. Generally, such a thermochemical system 10 may include an organic material feed module 20, a reactor module 30, and a solid product finishing module 60, and those various components may be comprised of elements that function in a manner similar to those described herein for a thermochemical system 10 having one chimney 50. As shown in FIGS. 6A & 6B, the solid material finishing module 60 may be shorter in length compared to the solid material finishing module 60 shown for the thermochemical system 10 in FIGS. 2A-2D.

In an alternative embodiment shown in FIGS. 6A & 6B, the thermochemical system 10 may be configured with two chimneys 50 and no afterburner module 40. Each chimney 50 may be fluidly connected to a portion of the reactor module 30 at different locations, wherein an adjustable horizontal gate 19*b* at each interface between the chimney 50 and reactor module 30 may allow a user/operator to manipulate various operational parameters of the thermochemical process (e.g., temperature profile, combustion properties, inlet air flow characteristics, etc.). In such an embodiment, one chimney 50 may be positioned adjacent the interface between the organic material feed module 20 and the reactor module 30, and a second chimney 50 may be positioned adjacent the interface between zone one 31*a* and zone two 31*b* of the reactor module 30. Alternatively, the second chimney 50 may be positioned in zone two 31*b* of the reactor module 30 in a position that corresponds to the position of the chimney 50 shown in FIGS. 2A-2C. It is contemplated that for certain applications, one or more chimneys 50 may be positioned adjacent a portion of the reactor module 30 with the highest or nearly the highest operating temperature along the length of the reactor module 30. However, other configurations may be used without limitation unless otherwise indicated in the following claims.

The solid material may move from the reactor module 30 to a solid product finishing module 60. The solid product finishing module 60 may be configured with a heat exchanger/insulator 62 surrounding all or a portion thereof, and a solid product outlet 64 formed at an end thereof opposite the reactor module 30. A solid product conveying member 67 may provide the motive force to the solid product to urge it through the solid product finishing module 60 and out the solid product outlet 64. The solid product conveying member 67 may be formed as an auger (as shown at least in the illustrative embodiment of a thermochemical system 10 shown in FIG. 6A) but any suitable conveying member may be used without limitation unless so indicated in the following claims including but not limited to paddles, screws, belts, chain conveyors, rotating drums, etc. The solid product may be treated in a variety of manners, including but not limited to being wasted with a solvent, water, acid, base, etc. without limitation unless so indicated in the following claims.

The function of the heat exchanger/insulator 62 may vary depending on the desired solid product from the thermochemical system 10. If the thermochemical system 10 is configured to yield an activated carbon product, the temperature at least within zone three 31*c* and the solid product finishing module 60 may be higher than the temperature therein if the thermochemical system 10 is configured to yield biochar or other carbon products. Furthermore, in a configuration configured to produce activated carbon, the length of the solid product finishing module 60 and heat exchanger/insulator 62 may be longer to increase the residence time for solid material positioned therein to ensure sufficient time for activation. The heat exchanger/insulator may act merely as an insulator for the solid material within the solid product finishing module 60, thereby preventing/mitigating heat loss from the solid material to an external environment. It is contemplated that these higher temperatures may be achieved by using thermal energy from the combustion of various gases and/or vapors released during the thermochemical process as described in further detail below. Additionally, for activated carbon products the thermochemical system 10 may be configured such that certain additives (e.g., gases and/or vapors for oxidation, such as high-temperature steam) may be introduced to the reactor vessel 33 and/or solid product finishing module 60. In other configurations, the heat exchanger/insulator 62 may function to cool the solid material within the solid product finishing module 60.

In one embodiment, the reactor conveying member 37 may be coupled to the feed module conveying member 27 such that they both rotate at the same speed, and such that the motor 12 (which for many applications may be a variable speed motor 12) engaged with the feed module conveying member 27 provides rotational energy to the reactor conveying member 37 as shown in FIG. 2B. A second motor 12 (which may also be configured as a variable speed motor 12) may be engaged with the solid product conveying member 67 as shown in FIG. 2B, and the solid product conveying member 67 may be coupled to the reactor conveying member 37 such that they rotate at the same speed. In such a configuration, the torque the reactor conveying member 37 experiences may be reduced because the motor engaged with the feed module conveying member 27 may provide rotational energy to a first end of the reactor conveying member 37 and the motor 12 engaged with the solid product conveying member 67 may provide rotational energy to a second end of the reactor conveying member 37. Furthermore, in such a configuration the feed module conveying member 27, reactor conveying member 37, and solid product conveying member 67 may be formed as one continuous conveying member (e.g., an auger) and the reactor vessel 33 and area around the solid product conveying member 67 may be formed as one continuous member (e.g., a pipe into which the continuous auger is positioned), which configuration is shown at least in the illustrative embodiment of a thermochemical system 10 pictured in FIGS. 6A & 6B. Such a configuration may require a common control for the two motors 12 to ensure they operate in unison. However, the feed module conveying member 27, reactor conveying member 37, solid product conveying member 67, and/or the structure positioned therearound may be differently configured without limitation unless so indicated in the following claims. The residence time within the thermochemical system 10 may be modified by adjusting the speed of the motor(s) 12 engaged with the feed module conveying member 27, reactor conveying member 37, and solid product conveying member 67.

It is contemplated that in various embodiments of a thermochemical system 10, features within the reactor vessel 33 may affect the boundary from one module and/or zone within a module to the next. As will be evident to those skilled in the art in light of the present disclosure, the thermochemical system & method may be separated into distinct modules, regions, and/or zones. The various operational parameters of one region (e.g., temperature, combustion gases and/or characteristics, etc.) may be controlled separately and independently of another region even in the instance the two regions are adjacent one another without limitation unless so indicated in the following claims. This independent and separate control may allow for great flexibility and control over the properties of the end product(s) (solid, liquid, gas, and/or vapor).

The optimal materials for construction of the organic material feed module 20, reactor module 30, afterburner module 40, chimney 50, and solid product finishing module 60 and components thereof (e.g., vessel shroud 32, reactor vessel 33, fins 33a, shield 35, and/or reactor conveying member 37) may vary depending at least upon the operational parameters for the thermochemical system 10. For example, if the thermochemical system 10 is configured such that the temperature in any zone 31a, 31b, 31c reaches 700 C or higher (and in some configurations from 700 to 1300 C), it may be necessary to construct certain portions of the reactor module 30 and solid product finishing module 60 (e.g., reactor vessel 33, shield 35, conveying member 37, solid product conveying member 67) from a ceramic material, with a ceramic material coating, or other material capable of adequately withstanding such temperatures. In other configurations, metal and/or metallic-based alloys may be used such as RA 253 or high-temperature stainless steel. Graphite seals may be used along with high-temperature silicone (e.g., RTV) or fiberglass rope. Additionally, various insulators may be used on the reactor module 30 (e.g., around the exterior of the vessel shroud 32) to increase the efficiency of the thermochemical system 10. Accordingly, the scope of the present disclosure is in no way limited by the materials of construction for the organic material feed module 20, reactor module 30, afterburner module 40, chimney 50, and solid product finishing module 60 and/or components thereof and/or the placement of insulative materials therein unless otherwise indicated in the following claims.

Various components of the thermochemical system 10 may be elevated from the ground surface or a flooring structure using one or more support members 14, which may be adjustable in height. The support members 14 may be configured as metallic angle or box supports. The support members 14 may be configured such that the inclination of the all or a portion of the thermochemical system 10 may be adjustable (by adjusting the height of one or more support members 14 relative to other support members 14), which may improve natural draft and/or material flow, and which may affect the residence times of the solid material, liquids, gases, and/or vapors. However, in certain applications support members 14 may not be required, and in other applications they may be differently configured (e.g., bricks, earthen-based, etc.). Accordingly, the presence of support members 14 and/or the specific configuration thereof in no way limits the scope of the present disclosure unless so indicated in the following claims.

The thermochemical system & process may be configured such that a relatively low amount of instrumentation is required to achieve a desired result. For example, with just one temperature sensor 18 positioned at or near the reactor module 30 at the location shown in FIG. 2C, the thermochemical system 10 may be configured to yield a relatively consistent product. This is because with the configuration of the thermochemical system 10 shown in FIGS. 2A-2C, knowing the temperature near the interface between zone one 31a and zone two 31b of the reactor module 30 provides insight as to the progress and rate of the thermochemical process in zone two 31b, zone three 31c, and the solid product finishing module 60.

Additional temperature sensors allow for increased consistency in the properties of the product(s) as well as increased efficiency of the thermochemical system 10. In one embodiment, in addition to the temperature sensor 18 shown in FIG. 2C, a second temperature sensor 18 may be positioned in the first horizontal section 30a of zone one 31, as shown in FIG. 2B. For further control and/or efficiency, another temperature sensor may be positioned in the first horizontal section 30a of the zone three 31c. Additional temperature sensors 18 may be positioned in each horizontal section 30a, in the afterburner module 40, and adjacent the solid product outlet 64. However, the specific number and/or position of temperature sensors 18 and/or any other operational parameter sensor in no way limits the scope of the present disclosure unless so indicated in the following claims. Additional sensors such as UV, carbon dioxide, carbon monoxide, nitrous oxide, pressure, soot, and/or oxygen sensors may be used, as may accelerometers, vibratory sensors, and/or other sensors without limitation unless so indicated in the following claims.

As previously discussed, an illustrative embodiment of a thermochemical system 10 may include one or more blowers 16 configured to blow gases/vapors within the ventilation/combustion chamber 38 countercurrent to the flow of solid material within the reactor vessel 33. That is, the gases/vapors may move from right to left in the solid product finishing module 60 and/or reactor module 30 (and zones 31a, 31b, and 31c thereof, respectively, in the orientation shown in FIGS. 2B & 2C (e.g., in a direction from the solid product finishing module 60 toward the organic material feed module 20).

Two such blowers 16 are shown in FIG. 2D, where a first blower 16 is positioned adjacent the solid product outlet 64 of the solid product finishing module 60 and the second blower 16 is positioned adjacent the interface between the reactor module 30 and the solid product finishing module 60. Each blower 16 may be configured with a variable speed motor such that an operator may manipulate the volumetric flow rate for each blower 16. The thermochemical system 10 may be configured such that the temperature within various portions thereof may be controlled at least partially based on the settings of one or more blowers 16, and specifically the temperature within the reactor module 30 and/or various zones 31a, 31b, 31c, thereof. With all other settings approximately equal, increasing the airflow from a blower 16 into the ventilation/combustion chamber 38 (e.g., increasing the speed of the blower 16) may increase the temperature within the reactor module 30 (and/or zones 31a, 31b, 31c, thereof wherein combustion is occurring) while decreasing the airflow from a blower 16 into the ventilation/combustion chamber 38 may decrease the temperature within the reactor module 30 (and/or zones 31a, 31b, 31c, thereof wherein combustion is occurring). Also, cooling could be performed by adding excess air in an amount greater than that needed to stoichiometrically burn the gases and/or vapors, which excess air may result in an effect similar to cooling down the reactor module.

In certain applications it may be advantageous to provide an upper limit on the allowed speed of one or more blowers 16 to prevent a chemical reaction within the reactor module from proceeding too fast, as increasing heat within the reactor module may increase the rate at which combustible gases/vapors are released from the organic material, which may increase the amount of combustion occurring within the reactor module 30, which may increase the amount of heat therein, etc. In such applications other methods and/or apparatuses may be used to prevent a chemical reaction from occurring faster than desired without limitation unless otherwise indicated in the following claims, including but not limited to the various sensors and controllers disclosed herein.

With reference to FIGS. 2B-2D, the temperature within the ventilation/combustion chamber 38 may increase in a direction from the left of the figures to the right thereof (i.e., from the solid product finishing module 60 toward the organic material feed module 20) because the blower 16 may provide ambient air to the solid product finishing module 60, which air is then used for combustion within the reactor module 30 and/or afterburner module 40. Accordingly, the temperature of gases within the solid product finishing module 60 may be less than that of gases within zone three 31c, which may be less than that of gases in zone two 31b, which may be less than that of gases in zone one 31a. Zone one 31a may be fluidly connected to the afterburner module 40 adjacent the right portion thereof (as shown in the orientation of FIGS. 2B-2D) as previously described above regarding various gates 19a, 19b and/or other methods and/or apparatuses for manipulating the fluid flow characteristics within the thermochemical system 10.

Generally, it is contemplated that a thermochemical system 10 constructed with properly sealed joints between various elements (e.g., horizontal sections 30a of the reactor module 30, an interface between an afterburner module 40 and reactor module 30, etc.) may not require gates 19a, 19b as described above to adequately control the temperature profile of the thermochemical system 10. Instead, in such thermochemical systems 10 it is contemplated that the temperature profile may be controlled via one or more blowers 16 as previously described. This is because properly sealed joints may prevent ambient air from entering the thermochemical system 10 (which may occur because of a suction effect caused by a draft from combustion) and affecting combustion amount and/or rate. However, gates 19a, 19b may be used on thermochemical systems 10 having adequately sealed joints without limitation unless otherwise indicated in the following claims.

The temperature within the reactor vessel 33 (and consequently the temperature of the solid material within the thermochemical system 10) may have a different temperature profile along the length thereof than previously described for the gases/vapors, and the temperature of the solid material may depend at least upon the organic material feedstock and desired products. In one application the temperature of the solid material within the solid material finishing module 60 may be relatively low, such as 50 to 100 C, the temperature of the solid material within the reactor vessel 33 may increase from the solid material finishing module 60 to zone three 31c, and may increase further from zone three 31c to zone two 31b, wherein the solid material may reach its peak temperature. The temperature of the solid material may decrease from zone two 31b to zone one 31a and decrease further from zone one 31a to the solid material feed module 20, wherein the solid material may be generally at ambient temperature.

Generally, configuring the thermochemical system 10 such that combustion of gases/vapors occurs outside of the reactor vessel 33 but very near thereto (i.e., in the ventilation/combustion chamber 38 immediately adjacent the reactor vessel 33) may allow for easier and more efficient pyrolysis within the reactor vessel 33. Because heating of the organic material within the reactor vessel 33 may provide greater than ambient pressure within the reactor vessel 33, and because gases and/or vapors may be exiting the reactor vessel 33 through apertures 34, no air (or a negligible amount of air) may enter the reactor vessel 33. Additionally, controlling the temperature of the reactor module 30 (and/or zone 31a, 31b, 31c thereof), which may be done by controlling the amount of combustion within the reactor module 30 (and/or zone 31a, 31b, 31c thereof) may be very important to yield the desired product(s). For example, too much heat (which may be caused by too much combustion) may burn the solid material, whereas too little heat (which may be caused by too little combustion) may not sustain the desired chemical reaction such that the desired product(s) are not produced or not produced with the desired yield(s).

Figure 4:
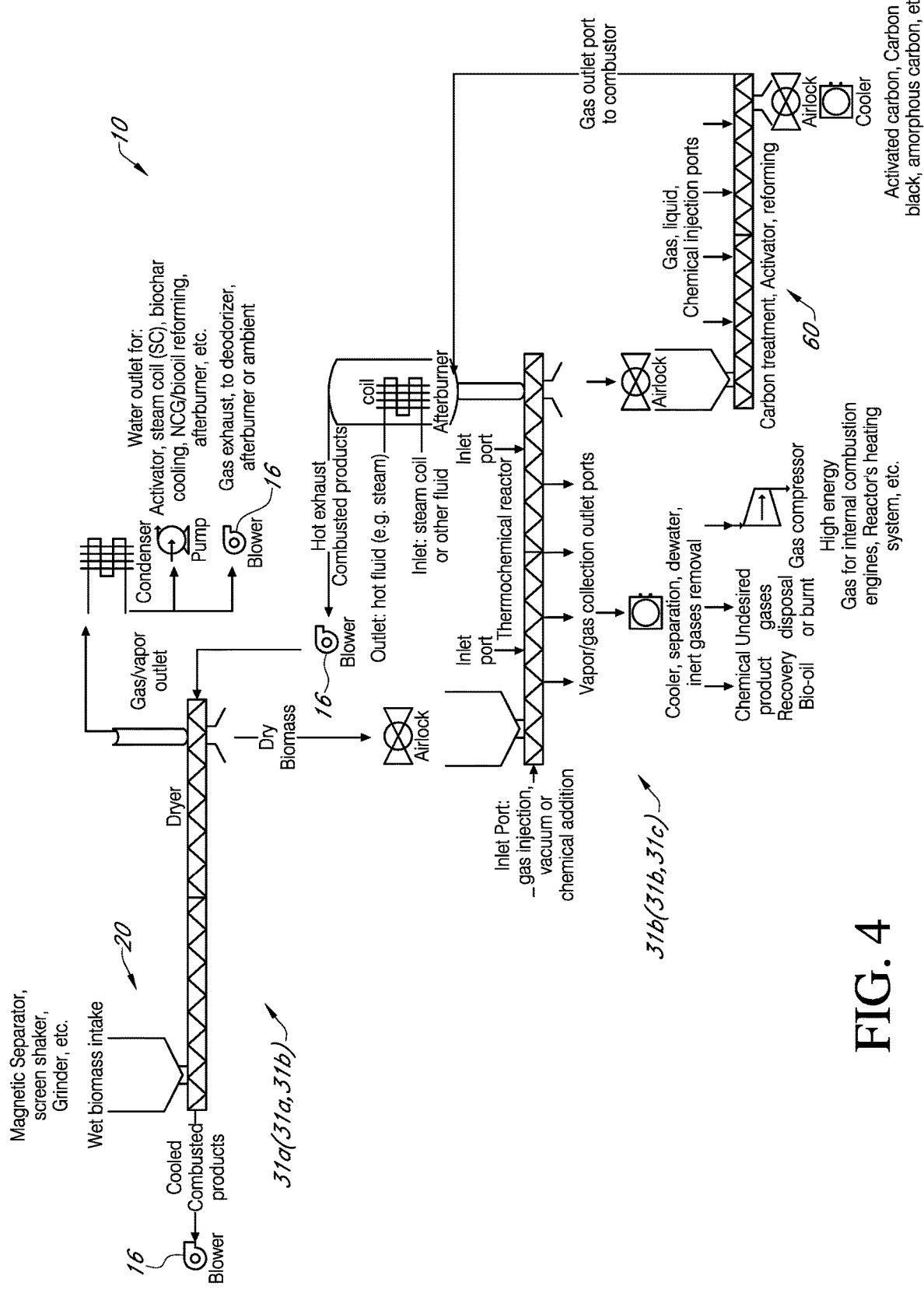
FIG. 4 provides another schematic view of a thermochemical system and method as well as several components thereof.
Figure 5A:
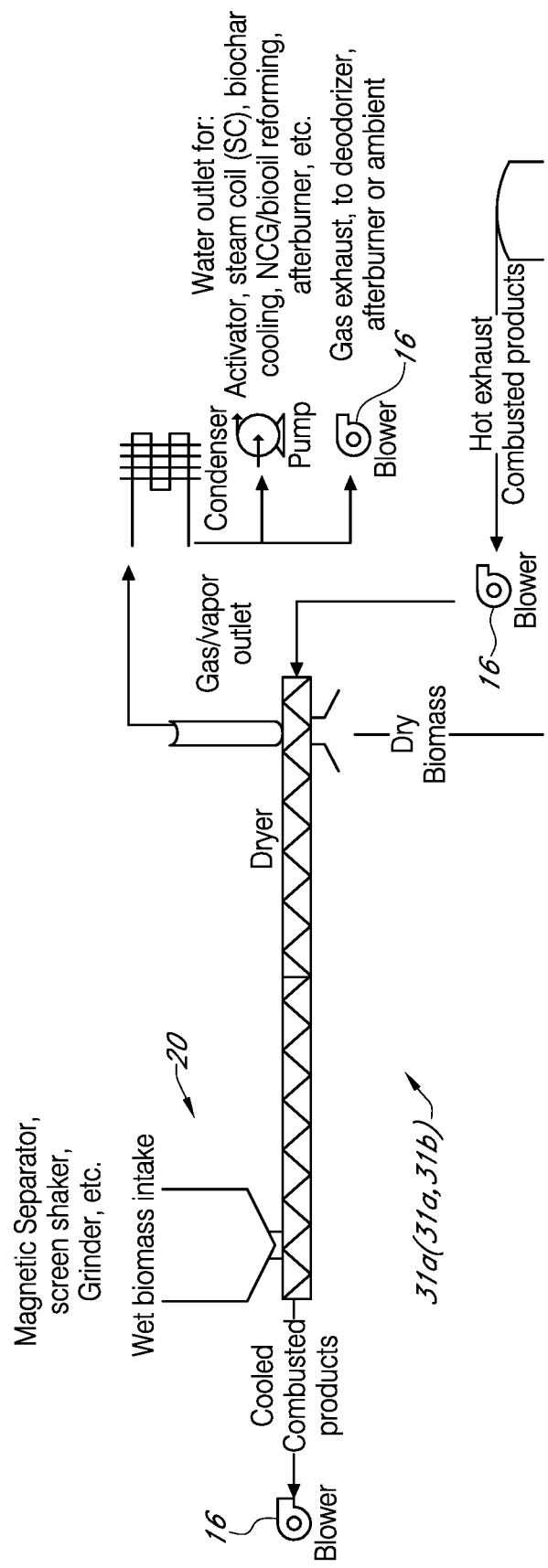
FIG. 5A provides a detailed view of a portion of the thermochemical system and method shown in FIG. 4.
Figure 5B:
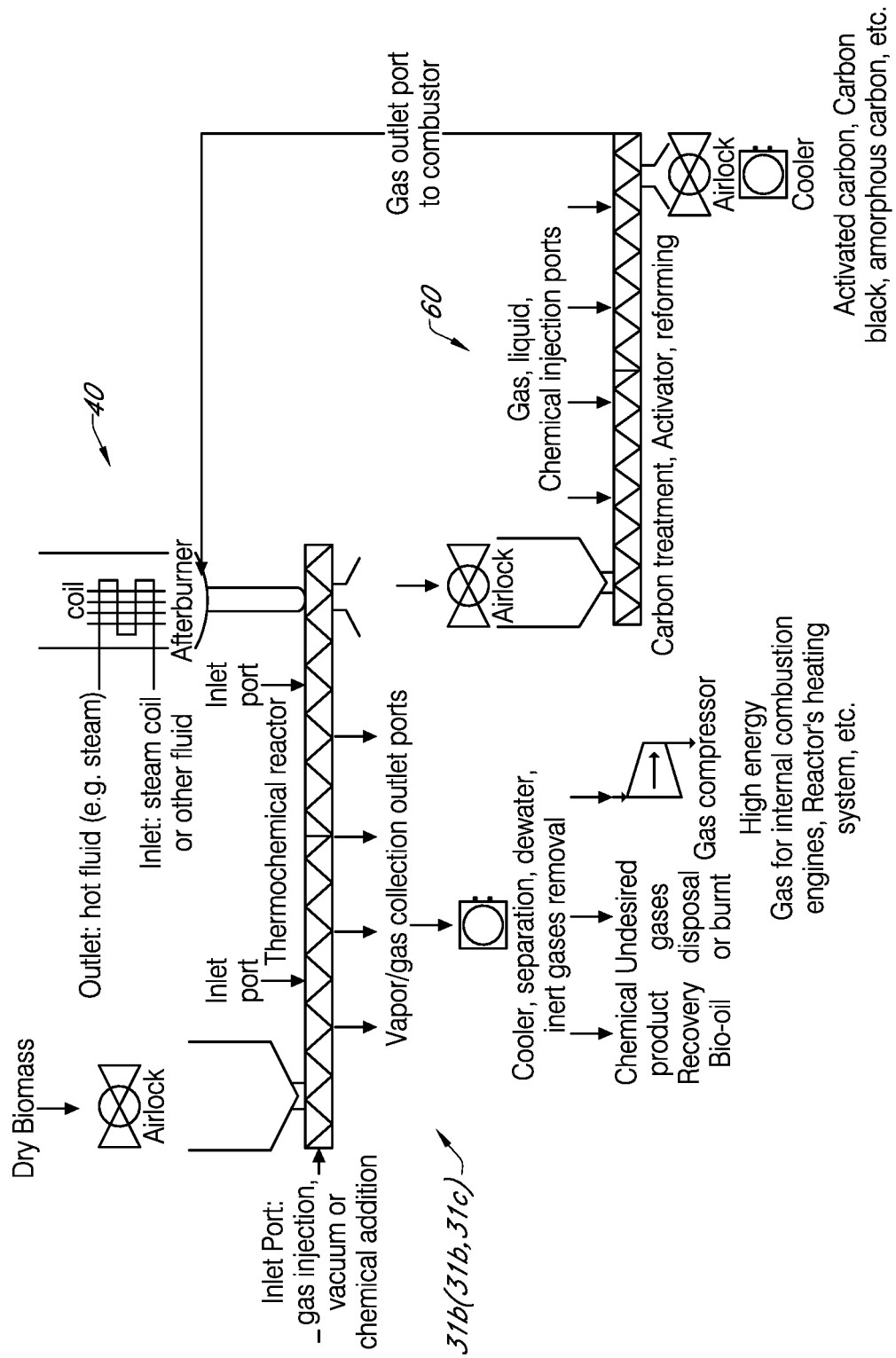
FIG. 5B provides a detailed view of another portion of the thermochemical system and method shown in FIG. 4.
Figure 5C:
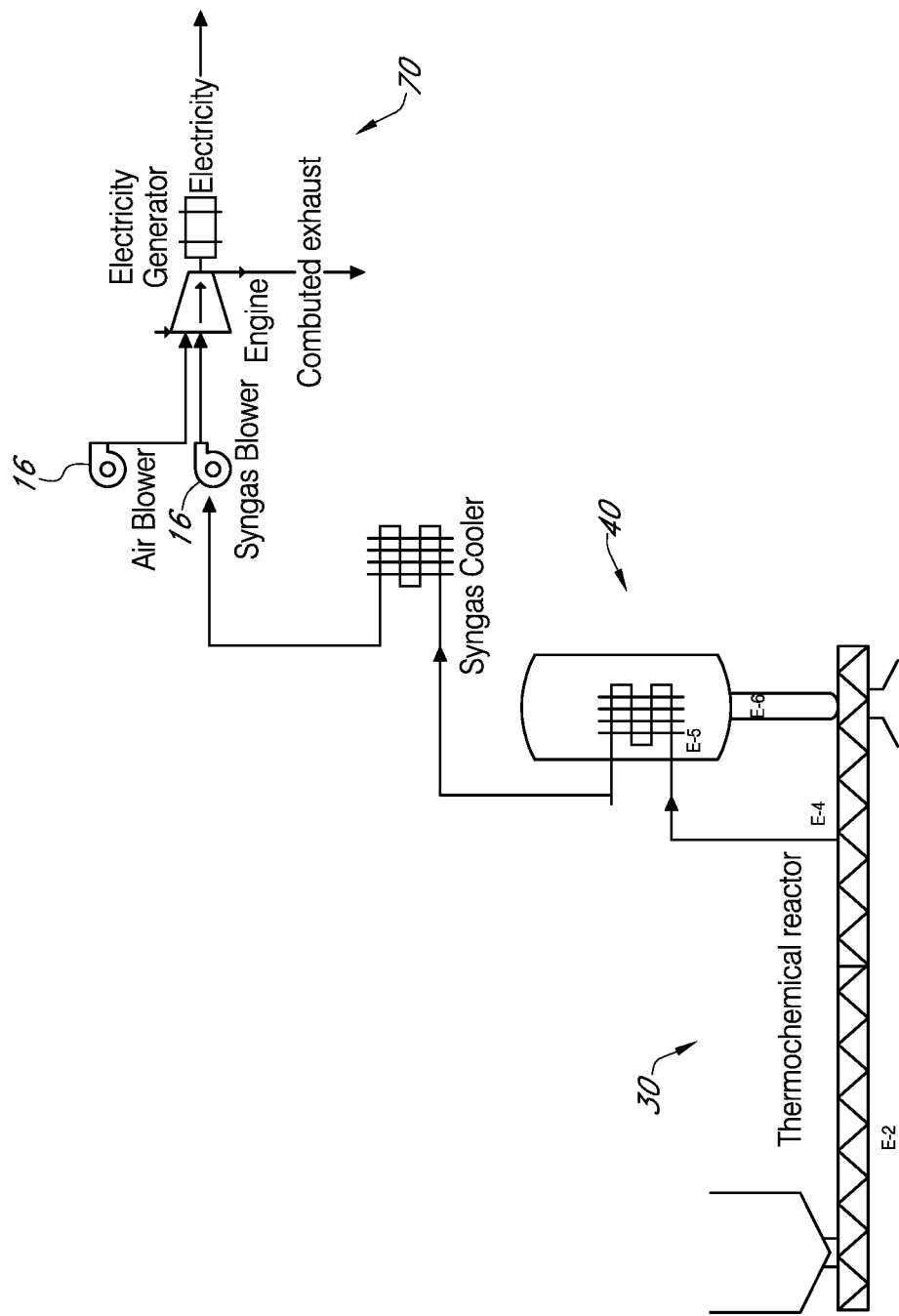
FIG. 5C provides a detailed view of an illustrative embodiment of an electricity generation module that may be included with the thermochemical system and method.

Referring now to FIGS. 4-5B, which provide a simplified schematic representation (or process flow diagram) of a thermochemical system & method, for illustrative purposes the thermochemical system & method may be visualized as three portions: (1) a dryer portion; (2) a reactor portion; and, (3) a finishing portion. The dryer portion may correspond to a first portion of the reactor module 30 (such as zone one 31a, or zones one and two 31a, 31b), the reactor portion may correspond to a second portion of the reactor module 30 (such as zone two 31b, or zones two and three 31b, 31c), and the finishing portion may correspond to the solid product finishing module 60 (all as previously described above). Generally, the dryer portion is shown in more detail in FIG. 5A (and is shown in the upper left-hand area of FIG. 4) and the reactor and finishing portions are shown in more detail in FIG. 5B (wherein the reactor portion is shown in the middle of FIG. 4 and the finishing portion is shown in the lower right-hand area of FIG. 4). For certain configurations of a thermochemical system 10, a dryer portion may not be required, such as when the thermochemical system 10 is used with an organic material feedstock that is relatively dry initially. In such a configuration, the dryer portion may instead constitute a zone 31a, 31b, 31c of the reactor module 30.

Referring specifically to FIG. 5A, the organic material used as a feedstock for the thermochemical system 10 may undergo various pretreatment steps, which pretreatment steps include but are not limited to magnetic separator, sieves, screen shaker, grinder, chopper, chemical treatment (e.g., addition of catalyzing agent), and/or combinations thereof unless so indicated in the following claims. In the dryer portion, the flow of the organic material may be opposite that of the drying fluid, which drying fluid may comprise flue gas, combusted products, air, and/or combinations thereof without limitation unless so indicated in the following claims. It is contemplated that to make the thermochemical system 10 more efficient, it may be advantageous to use excess heat from elsewhere in the thermochemical system 10 (e.g., exhaust gases from the afterburner module 40, which may be at a temperature between 400 and 1300 C) to aide in drying the organic material in the dryer portion as previously described above and as shown in FIG. 4. Generally, it is contemplated that it may be advantageous to provide this excess heat from elsewhere in the thermochemical system to the ventilation/combustion chamber 38 to facilitate a large amount of heat transfer via convection. However, other heat transfer modes and/or structures therefor may be used without limitation unless so indicated in the following claims.

As shown, a blower may be fluidly connected to the dryer portion to facilitate vapor and/or gas flow from the dryer portion. Any gas and/or vapor removed from the organic material may be condensed and/or otherwise collected for later processing, use, and/or disposal, as shown by the upward and right-facing arrow at the right-hand part of the dryer portion. In one illustrative embodiment, steam collected from the dryer portion may be used in the finishing portion as further described in detail below. In one illustrative embodiment, the exhaust from a blower pulling vapor and/or gas from the dryer portion may be routed to the afterburner module 40 (as shown at least in FIG. 5B).

Still referring to FIG. 5A, the dried organic material may exit the dryer portion (as represented by the downward arrow) and enter the reactor portion. As shown in FIGS. 4 and 5B, an air lock may be positioned between the dryer portion and the reactor portion. It is contemplated that when adding gas, vapor, chemicals, vacuum, etc. into the reactor portion it may be advantageous to utilize an airlock. However, the advantage of utilizing an airlock may vary at least depending on the desired properties of the final solid product and/or sensitivity of one or more products and/or the thermochemical process required to produce same to ambient environment conditions. For example, if the desired product solid product is relatively sensitive to environmental gases or needs to be air tight, a series of tight knife valves or air locks may be incorporated in both input (dryer portion) and output (activation portion) to prevent and/or mitigate egress of gases from thermochemical system 10 and/or ingress of air and/or moisture thereto. Accordingly, the presence of air locks is in no way limiting to the scope of the present disclosure unless so indicated in the following claims.

Referring now to FIG. 5B, the inlet ports shown in the reactor portion may be used to inject any number of substances, including but not limited to nitrogen, syngas, combustion products, steam, water, carbon dioxide, other gases, vapors, chemicals, and/or combinations thereof into the reactor vessel 33 and/or ventilation/combustion chamber 38 in a controlled and predetermined manner. Injection of a substance into the reactor vessel 33 and/or ventilation/combustion chamber 38 may serve to allow increased control of the temperature within the ventilation/combustion chamber 38. By allowing a user/operator to increase the temperature within the reactor vessel 33 and/or ventilation/combustion chamber 38, the thermochemical system 10 may allow the user/operate to increase the rate at which the organic material within the reactor vessel 33 is processed. Injection of such substances may also allow a user/operator to manipulate the thermochemical reaction in a manner that affects the chemical properties of the end products (solid, liquid, gas, and/or vapor). Depending on the desired properties of the end product(s), the substances and flow thereof may be adjusted to optimize those properties. In other illustrative embodiments of the thermochemical system 10 such inlet ports are not present.

Heat generated via combustion (or other exothermic chemical reactions) in the afterburner module 40 may be captured via a coil positioned therein, wherein a portion of the thermal energy may be transferred to a fluid medium (e.g., air, oil, water, compressed steam, etc.). Additionally, another coil may be included in the afterburner module 40 to further process the syngas by exposing any tar (or other relatively long chain hydrocarbons) to relatively high temperatures, which may further breakdown the tars present with the syngas. That is, the elevated temperatures may cause the tars to break down into gas products. The fluid medium may then be moved to another area of the thermochemical system 10 and/or externally thereto for further use. In one illustrative embodiment air may be used as a fluid medium and after it is heated in the coil of the afterburner module 40 it may provide additional thermal energy to the finishing portion via directly injecting the heated air via one or more injection ports formed in the reactor vessel 33 and/or ventilation/combustion chamber 38 of the solid process finishing module 60 and/or zone three 31c of the reactor module 30. Additionally, or alternatively, all or a portion of the exhaust gases from the afterburner module 40 may be routed (with or without a blower) to one or more injection ports formed in the solid process finishing module 60.

Liquids, gases, and/or vapors may be released from the organic material in the reactor portion and collected for later use and/or disposal as shown schematically by the downward arrows extending from the thermochemical reactor in FIG. 5B. A portion of the liquids, gases, and/or vapors may be combusted in the afterburner module 40. The optimal ratio of liquids, gases, and/or vapors that are collected and/or disposed of compared to those that are combusted may vary from one application of the thermochemical system 10 to the next, and may depend at least upon the organic material feedstock and desired properties of the solid product. Accordingly, that ratio is in no way limiting to the scope of the present disclosure unless otherwise indicated in the following claims.

The finishing portion (which corresponds to the solid product finishing module 60 as previously described above) may be configured to affect various properties of the solid product. For example, in one illustrative embodiment the finishing portion may be configured such that the solid product is activated carbon, and in another illustrative embodiment it may be configured such that the solid product is carbon black. In still another illustrative embodiment it may be configured such that the solid product is amorphous carbon.

The thermochemical system 10 may be configured such that the solid product may be dry biomass, biochar, activated carbon, black/amorphous carbon, charcoal, and/or combinations thereof, and such that the liquid, gas, and/or vapor products may be bio-oil, green chemicals such as (phenolic, furans, sugars, organic acids, etc.), syngas, energy dense gases, combusted products, and/or combinations thereof. Accordingly, the scope of the present disclosure is in no way limited by the specific solid, liquid, gas, and/or vapor product of the thermochemical system & method unless otherwise indicated in the following claims.

An airlock may be positioned adjacent the solid product outlet of the finishing portion as shown in FIG. 5B, but the advantages of such an airlock will vary from one application of the thermochemical system 10 to the next and the presence thereof is therefor in no way limiting to the scope of the present disclosure unless so indicated in the following claims. It is contemplated that configurations of the thermochemical system 10 in which it may be advantageous to remove a relatively high amount of thermal energy from the solid product after it has passed through the finishing portion may benefit from an airlock so positioned.

Liquids, gases, and/or vapors may be released from the solid material in the finishing portion, and all or a portion of those liquids, gases, and/or vapors may be routed to the afterburner module 40 for combustion and/or collected for later use, purification, and/or disposal.

It will be apparent to those skilled in the art in light of the present disclosure that the thermochemical system & method may be operated in a continuous manner (as opposed to a batch-style operation). Accordingly, the multiple advantages and/or features of a continuous-operation process may be imparted to the thermochemical system and method. One such advantage is that the feedstock may be processed and/or converted in a matter of minutes instead of hours, and another such advantage is that the thermochemical system 10 may be operated at steady state.

The reactor module 30 of the thermochemical system 30 may be configured to yield various solid, liquid, gas, and/or vapor products as previously mentioned. These various configurations may be achieved via adjusting specific operational parameters of the thermochemical system 30 without changing the components of the thermochemical system 10, or the various configurations may be achieved via alternative combinations/configurations of the components of the thermochemical system 10. The reactor module 30 may be configured as a pyrolysis reactor, and multiple reactions may be occurring simultaneously within different portions of the reactor module 30 and/or other portions of the thermochemical system 10 (e.g., combustion in the ventilation/combustion chamber 38 and/or afterburner module 40, activation in the solid product finishing module 60, gasification, torrefaction, carbonization, etc.). Accordingly, the scope of the present disclosure is not limited by the specific solid, liquid, gas, and/or vapor products produced by the thermochemical system & method unless otherwise indicated in the following claims.

Generally, and again with reference to Table 1 above, a thermochemical system 10 according to the present disclosure may be versatile in various operating conditions, with various thermochemical processes, and used to make various products from a wide variety of feedstocks. The thermochemical system 10 is capable of many configurations to perform drying, torrefaction, pyrolysis, gasification, activation, combustion, incineration, etc. The thermochemical system 10 as disclosed herein may be more efficient than those found in the prior art and simultaneously more simple to construct and/or operate than those found in the prior art, both of which advantages may primarily be due to the thermochemical system being able to sustain a thermochemical reaction without an external energy source (after an external energy source has been used to start the thermochemical reaction). Combusting gases and/or vapors emitted from the organic material immediately adjacent the reactor vessel 33 in the ventilation/combustion chamber 38 may serve to increase efficiency and simplicity of the thermochemical system 10 because no plumbing is required to move gases and/or vapors, nor is any plumbing required to effectuate heat transfer from the combustion of the gases to the material within the reactor vessel 33.

The versatility and adaptability of the thermochemical system 10 may be due at least in part to the modularity of the illustrative embodiments thereof. The thermochemical system 10 may be configured for use as a drier utilizing one or more external heat sources 17. Alternatively, the thermochemical system 10 may be configured for torrefaction of organic material by heating an organic feedstock to achieve dry the feedstock and sustain mild decomposition and partially transform the feedstock. The thermochemical system 10 may be configured for pyrolysis of an organic feedstock (which may produce a solid product comprised of biochar, a liquid product comprised of bio-oils and/or condensable gases/vapors, and a gaseous product of non-condensable gases). The thermochemical system 10 may be configured for gasification of an organic feedstock in applications wherein air is introduced into the reactor vessel 33 at various points. The thermochemical system 10 may be configured for activation of an organic feedstock wherein various gases, steam, and/or other chemicals may be introduced into the reactor vessel 33 at various points. The thermochemical system 10 may be configured for incineration of an organic feedstock wherein the residence time of the organic feedstock within the reactor vessel 33 and a sufficient quantity of air is supplied to the reactor vessel 33 cooperate to ensure all or nearly all organics have been burned (which may be advantageous for cleaning and recycling diatomaceous earth).

Additionally, the temperature of the ventilation/combustion chamber 38 and the temperature of the reactor vessel may be controlled by the amount and/or degree of combustion of gases/vapors released from the organic material in the reactor vessel is performed in the ventilation/combustion chamber 38 of the reactor module 30 relative to the amount and/or degree performed outside the reactor module 30 (e.g., in an afterburner module 40 and/or a chimney 50). Controlling and/or manipulating these relative amounts and/or degrees of combustion of released gases/vapors may be done through providing additional air using one or more blowers 16 and/or via modifying the draft (which may be done using one or more vertical gates 19a or horizontal gates 19b). The position of the air inlet (either via natural fluid or from a blower 16) and adjusted draft may contribute to efficient combustion of gases/vapors and simultaneously relatively clean emissions. As previously described, excess thermal energy (which may be in the form of combustion exhaust) may be used for drying a feedstock, for activating char, to provide thermal energy to other portions of the thermochemical system 10, and/or to produce electricity.

The thermochemical system 10 as disclosed herein may provide a user with a high degree of modularity. Additional components may be added, rearranged, etc. with relative ease such that the thermochemical system 10 may be configured to yield different products, increase efficiency, increase safety, provide mobility, and/or accommodate different organic material feedstocks. For example, additional horizontal sections 30a may be added to increase the length of the reactor vessel 33 (and potentially the residence time of solid material therein), the location and/or number of the chimney(s) 50 and afterburner module(s) 40 may be adjusted, etc. It is contemplated that multiple components of a thermochemical system 10 may be configured to be positioned within one or more standard-sized shipping containers (such as intermodal shipping containers) such that the shipping containers with the components therein may be relocated with relative ease and a minimal amount of disassembly of the thermochemical system 10.

Generally, a thermochemical system 10 may be assembled in one "train" (e.g., one continuous system having a beginning section and an end section with one or more inputs and/or outputs along the length thereof), and a user may configure the thermochemical system 10 such that various processes may be completed in series using different components. For example, one thermochemical system 10 may be configured dry an organic material in a first section (which may constitute zone one 31a of a reactor module 30), cause the organic material to undergo a chemical reaction in a second section (which may constitute zone two 31b of a reactor module 30), cause activation of the organic material in a third section (which may constitute zone three 31c of a reactor module or which may constitute a solid product finishing module 60), cause cooling and/or other post treatment (e.g., adding nutrients or other chemicals, adjusting pH, etc.) in a fourth section (which may constitute another zone of a reactor module or which may constitute a solid product finishing module 60), and so on. The various sections may be discreet hardware modules 20, 30, 40, 60 as disclosed in detail herein, and may be rearranged, adjusted, differently configured, etc. for a specific application or specific processing requirement. This may enhance the versatility of the thermochemical system 10 by increasing the variety of products it may be configured to produce, by increasing the variety of feedstocks that may be used, and by increasing the range of temperatures that may be achieved at various points within the thermochemical system 10. Additionally, the modularity and discreetness of the hardware modules 20, 30, 40, 60 may allow for a relatively mobile thermochemical system 10 by easing transportation and adaptation to various configurations.

The thermochemical system 10 may be integrated with batteries, generators, solar panels, an electrical grid, etc. in remote locations due to the modularity and simplicity of the design. Additionally, multiple thermochemical systems 10 may be employed in parallel to increase the scale. In one configuration, another module (all or a portion of which also may be positioned in a shipping container, such as an intermodal container) may constitute an electricity generation module 70 (shown schematically in FIG. 5C), in which an internal combustion (alternatively, micro turbines, Peltier, Rankine cycle or heat engine) may be located. The electricity generation module 70 may provide electricity for various components of the thermochemical system 10 (e.g., motor(s) 12, external heat sources 17, etc.) or to external devices, such as an electrical grid as mentioned above. The electricity generation module 70 may be operated with syngas, fossil fuels (e.g., propane, diesel, gasoline) or other fuels without limitation unless so indicated in the following claims.

The thermochemical system 10 may be equipped with one or more communication modules such that certain aspects of the thermochemical system 10 may be remotely operated and/or controlled. Such a communication module may be wireless (e.g., 2G, 3G, 4G, or 5G mobile protocols, WiFi protocols, Bluetooth, etc.) and may also facilitate automated data logging, increased security via virtual private network (VPN) and remote lockouts and/or video cameras, automated SMS or email messages in certain situations, etc.

As a continuous process, the thermochemical system 10 may be fully automated from startup to shutdown. For example, with a sufficient supply of feedstock on hand, the user/operator may simply engage a start button that engages an external heat source 17 to begin the combustion and/or reaction, which may also engage one or more motors 12 on the various conveying members 27, 37, 67, and which may also engage one or more blowers to use heat generated by the thermochemical process in an efficient way within the thermochemical system 10. The control of gases and/or vapors (e.g., syngas) released within the organic material feed module 20 and/or reactor module 30 and combustion thereof may be automated via temperature sensors, blowers, and draft control, which may allow a user/operator to achieve a desired level of emissions.

The thermochemical system & method may be safer to operate than those of the prior art. Various factors that may lead to increases safety include but are not limited to: (1) the entire thermochemical system 10 may operate at ambient or near-ambient pressure (which also reduces the cost of the thermochemical system 10 compared to reactors that require one or more pressure-rated vessels); (2) various components of the thermochemical system 10 may be positioned within a structure (e.g., a standard-sized, intermodal shipping container) and the access to that structure may be controlled; (3) the power requirements for the entire thermochemical system (e.g., thermal energy to start the reaction and/or combustion of gases and/or vapors, electrical energy to power the feed module conveying member 27, reactor conveying member 37, solid product conveying member 67, etc.) may be relatively low; and, (4) the operation of the thermochemical system & method may be entirely automated.

As will be evident to those skilled in the art in light of the present disclosure, the thermochemical system & method may be separated into distinct modules, regions, and/or zones. The various operational parameters of one region (e.g., temperature, combustion gases and/or characteristics, etc.) may be controlled separately and independently of another region even in the instance the two regions are adjacent one another without limitation unless so indicated in the following claims. This independent and separate control may allow for great flexibility and control over the properties of the end product(s) (solid, liquid, gas, and/or vapor).

Although specific operating parameters or ranges of operating parameters for the organic material feed module 20, reactor module 30, zones 31a, 31b, and/or 31c thereof (e.g., temperature, pressure), afterburner module 40, chimney 50, and solid product finishing module 60 are provided above, such parameters are for illustrative purposes only and in no way limit the scope of the present disclosure unless so indicated in the following claims. Additionally, the border between one zone 31a, 31b, and/or 31c and another zone 31a, 31b, and/or 31c, between the organic material feed module 20 and reactor module 30, and/or between the reactor module 30 and solid product finishing module 60 may not be discrete, and the precise transition from one zone 31a, 31b, and/or 31c to an adjacent zone 31a, 31b, and/or 31c, from the organic material feed module 20 to the reactor module 30, and/or from the reactor module 30 to solid product finishing module 60 may vary during a single thermochemical process, and is therefore in no way limiting to the scope of the present disclosure unless so indicated in the following claims. Furthermore, drying, thermochemical reactions, combustion, and/or other processes may occur to a certain extent in any zone 31a, 31b, and/or 31c and/or module 20, 30, 60 without limitation unless so indicated in the following claims.

The thermochemical system & method as disclosed herein may be configured to yield a variety of gas, liquid, and solid products. Such gas products include but are not limited to biogases, and such liquid products include but are not limited to biooils. The solid products include but are not limited to char, biochar, activated carbon, carbon black, amorphous carbon, graphite, and/or combinations thereof. The solid product stream may comprise from 5-40% by weight of the total product stream, liquids (including but not limited to biooils) may comprise 0-70% thereof, and gases and/or vapors may comprise 15-95% thereof.

The thermochemical system and method disclosed herein may be configured to recycle thermal energy released in one portion of the thermochemical system to another portion of the thermochemical system for increased efficiency. Integrating the dryer portion (e.g., zone one 31a, or zone one 31a and a portion of zone 31b) with the thermochemical system 10 allows for a local use of thermal energy that might otherwise be wasted. The various thermal energy recycling schemes for increased efficiency may be utilized independently from one another and to varying degrees without limitation unless so indicated in the following claims. Furthermore, the components required for a thermochemical system 10 according to the present disclosure may be considerably less expensive than the components of the prior art (including but not limited to the necessary instrumentation as previously described above).

It is understood that the present disclosure extends to all alternative combinations of one or more of the individual features mentioned, evident from the text and/or drawings, and/or inherently disclosed. All of these different combinations constitute various alternative aspects of the present disclosure and/or components thereof. The embodiments described herein explain the best modes known for practicing the apparatuses, methods, and/or components disclosed herein and will enable others skilled in the art to utilize the same. The claims are to be construed to include alternative embodiments to the extent permitted by the prior art.

Unless otherwise expressly stated in the claims, it is in no way intended that any process or method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

The materials used to construct the apparatuses and/or components thereof for a specific process will vary depending on the specific application thereof, but it is contemplated that polymers, synthetic materials, metals, metal alloys, ceramics, natural materials, and/or combinations thereof may be especially useful in some applications. Accordingly, the above-referenced elements may be constructed of any material known to those skilled in the art or later developed, which material is appropriate for the specific application of the present disclosure without departing from the spirit and scope of the present disclosure unless so indicated in the following claims.

Having described preferred aspects of the various processes, products produced thereby, and/or apparatuses, other features of the present disclosure will undoubtedly occur to those versed in the art, as will numerous modifications and alterations in the embodiments and/or aspects as illustrated herein, all of which may be achieved without departing from the spirit and scope of the present disclosure. Accordingly, the methods and embodiments pictured and described herein are for illustrative purposes only, and the scope of the present disclosure extends to all processes, apparatuses, products, and/or structures for providing the various benefits and/or features of the present disclosure unless so indicated in the following claims.

While the thermochemical system & method, process steps, components thereof, apparatuses therefor, and products produced thereby have been described in connection with preferred aspects, illustrative embodiments, and specific examples, it is not intended that the scope be limited to the particular embodiments and/or aspects set forth, as the embodiments and/or aspects herein are intended in all respects to be illustrative rather than restrictive. Accordingly, the apparatuses, methods, processes, and embodiments pictured and described herein are no way limiting to the scope of the present disclosure unless so stated in the following claims.

Although several figures are drawn to accurate scale, any dimensions provided herein are for illustrative purposes only and in no way limit the scope of the present disclosure unless so indicated in the following claims. It should be noted that the thermochemical system & method, apparatuses and/or equipment therefor, and/or products produced thereby are not limited to the specific embodiments pictured and described herein, but rather the scope of the inventive features according to the present disclosure is defined by the claims herein. Modifications and alterations from the described embodiments will occur to those skilled in the art without departure from the spirit and scope of the present disclosure.

Any of the various features, components, functionalities, advantages, aspects, configurations, process steps, process parameters, etc. of a thermochemical system & method may be used alone or in combination with one another depending on the compatibility of the features, components, functionalities, advantages, aspects, configurations, process steps, process parameters, etc. Accordingly, a nearly infinite number of variations of the present disclosure exist. Modifications and/or substitutions of one feature, component, functionality, aspect, configuration, process step, process parameter, etc. for another in no way limit the scope of the present disclosure unless so indicated in the following claims.

The invention claimed is:
1. A thermochemical system comprising:
 a. an solid material feed module comprising a feed module conveying member providing motive force to move an organic feedstock from said solid material feed module;
 b. a reactor module comprising:
  i. a reactor vessel positioned within a vessel shroud, wherein a reactor conveying member is positioned within said reactor vessel;
  ii. a ventilation/combustion chamber defined as a space between said reactor vessel and said vessel shroud;
  iii. a first horizontal section defining a first zone within said reactor vessel;
  iv. a shield positioned within said shroud and over said reactor vessel to increase an amount of heat directed toward said reactor vessel, wherein said reactor vessel further comprises a plurality of fins extending outward therefrom, and wherein said ventilation/combustion chamber is further defined as a space between said reactor vessel and said shield;
 c. a chimney engaged with said reactor module, wherein said chimney is in fluid communication with a portion of said ventilation/combustion chamber;
 d. a solid product finishing module comprising:
  i. a solid product conveying member;
  ii. a solid product outlet; and,
 e. an external heat source positioned adjacent said solid material feed module.
2. A thermochemical method comprising the steps of:
 a. providing an solid material to an solid material feed module of a thermochemical system, said solid material feed module comprising a feed module conveying member providing motive force to move said solid feedstock from said solid material feed module;

b. providing a first portion of thermal energy to said solid material via an external heat source, wherein said external heat source is positioned adjacent said solid material feed module;

c. moving said solid material to a reactor module of said thermochemical system using said feed module conveying member, said reactor module comprising:
  i. a reactor vessel positioned within a vessel shroud, wherein a reactor conveying member is positioned within said reactor vessel, and wherein an aperture in said reactor vessel allows for removal of a gas or a vapor from said solid material positioned within said reactor vessel;
  ii. a ventilation/combustion chamber defined as a space between said reactor vessel and said vessel shroud;
  iii. a first horizontal section defining a first zone;
  iv. a shield positioned within said shroud and over said reactor vessel to increase an amount of heat directed toward said reactor vessel, wherein said reactor vessel further comprises a plurality of fins extending outward therefrom, and wherein said ventilation/combustion chamber is further defined as a space between said reactor vessel and said shield;

d. removing a combustible gas from said solid material via said first portion of thermal energy from said external heat source;

e. igniting said combustible gas within said ventilation/combustion chamber and providing a second portion of thermal energy to said reactor vessel, wherein said second portion of thermal energy is sufficient to sustain a reaction that causes said combustible gas to be removed from said solid material;

f. moving said solid material along a length of said reactor module via said reactor conveying member; and, g. removing said external heat source.

3. The method according to claim 2 wherein a third portion of thermal energy from combustion of said combustible gas is recycled to said solid material feed module to increase an efficiency of said thermochemical method.

4. The method according to claim 2 wherein said solid material feed module further comprises a first motor engaged with said feed module conveying member, wherein said solid product finishing module further comprises a second motor engaged with said solid product conveying member, wherein said feed module conveying member is coupled to said reactor conveying member, wherein said reactor conveying member is coupled to said solid product conveying member, and wherein said feed module conveying member, said reactor conveying member, and said solid product conveying member are further defined as being augers.

5. The method according to claim 4 wherein said feed module conveying member, said reactor conveying member, and said solid product conveying member are further defined as augers, and wherein a portion of fighting is removed between said feed module conveying member and said reactor conveying member so as to create a discreet boundary therebetween.

6. The method according to claim 2 wherein said thermochemical system further comprises a chimney in fluid communication with said ventilation/combustion chamber, and wherein said reactor module further comprises a horizontal gate positioned between said reactor module and said chimney.

7. The method according to claim 6 further comprising the steps of:
a. removing a gas from said solid material positioned in said solid product finishing module;
b. combusting said gas in said afterburner; and,
c. providing a fourth portion of thermal energy from combusting said gas to said organic material feed module.

8. The method according to claim 2 wherein said reactor module further comprises a second horizontal section defining a second reaction zone.

9. The method according to claim 8 wherein said reactor module further comprises a third horizontal section defining a third reaction zone, wherein a temperature of said first reaction zone is further defined as being greater than a temperature of said second reaction zone, and wherein a temperature of said third reaction zone is further defined as being less than said temperature of said second reaction zone.

10. The method according to claim 2 wherein said reactor module further comprises a second external heat source positioned adjacent said first horizontal section, wherein said second external heat source provides a fifth portion of thermal energy to said organic material positioned in said first horizontal section.

11. The method according to claim 10 further comprising the step of removing said second external heat source.

12. The method according to claim 2 wherein said organic product feed module, said reactor module, and said solid product finishing module further comprise a plurality of support members, wherein said plurality of support members are engaged with a floor surface, and wherein at least one said support member is adjustable in height such that an inclination of said reactor module is adjustable.

13. The method according to claim 12 further comprising the step of adjusting a height of each said support member in said plurality thereof such that an elevation of said organic product feed module, an elevation of said reactor module, and an elevation of said solid product finishing module relative to one another optimizes a ratio of a gas product stream, a liquid product stream, and a solid product stream of said thermochemical method.

14. The method according to claim 2 further comprising the step of moving said solid material to a solid product finishing module, wherein said solid product finishing module is engaged with said reactor module, and wherein a solid product conveying member provides motive force to said solid material positioned within said solid product finishing module.

15. The method according to claim 2 wherein said thermochemical system further comprises an afterburner, wherein said afterburner is in fluid communication with a portion of said ventilation/combustion chamber of said reactor module.

16. The method according to claim 2 wherein said igniting step is further defined as occurring immediately adjacent said reactor vessel.

17. The method according to claim 2 wherein said solid material is further defined as having an energy content of at least 5 megajoules per kilogram.

18. A method for controlling the temperature of a thermochemical system, said method comprising the steps of:
a. providing an solid material to an solid material feed module of said thermochemical system, said solid material feed module comprising a feed module conveying member providing motive force to move said solid feedstock from said solid material feed module;

b. moving said organic material to a reactor module of said thermochemical system using said feed module conveying member, said reactor module comprising:
  i. a reactor vessel positioned within a vessel shroud, wherein a reactor conveying member is positioned within said reactor vessel, and wherein an aperture in said reactor vessel allows for removal of a gas or a vapor from said organic material positioned within said reactor vessel;
  ii. a ventilation/combustion chamber defined as a space between said reactor vessel and said vessel shroud;
  iii. a first horizontal section defining a first zone;
  iv. a shield positioned within said shroud and over said reactor vessel to increase an amount of heat directed toward said reactor vessel, wherein said reactor vessel further comprises a plurality of fins extending outward therefrom, and wherein said ventilation/combustion chamber is further defined as a space between said reactor vessel and said shield;
c. providing a first portion of thermal energy to said solid material via an external heat source, wherein said external heat source is positioned adjacent said reactor module;
d. removing a combustible gas from said solid material via said first portion of thermal energy from said external heat source;
e. igniting said combustible gas within said ventilation/combustion chamber and providing a second portion of thermal energy to said reactor vessel, wherein said second portion of thermal energy is sufficient to sustain a reaction that causes said combustible gas to be removed from said organic material;
f. moving said solid material along a length of said reactor module via said reactor conveying member;
g. providing a flow of ambient air to said ventilation/combustion chamber using a blower fluidly connected to said ventilation/combustion chamber, wherein a direction of said ambient air is countercurrent to a direction of said solid material; and,
h. adjusting a volumetric flow rate of said flow of ambient air to affect a temperature within said reactor module.

19. The method according to claim 8, wherein said ventilation/combustion chamber is further defined as a space between said reactor vessel and said shield; and wherein said method further comprises the step of removing said external heat source.

* * * * *